US008625122B2

(12) United States Patent
Tsujimoto

(10) Patent No.: US 8,625,122 B2
(45) Date of Patent: Jan. 7, 2014

(54) AUTHENTICATION SERVER, MULTIFUNCTION APPARATUS, AND MULTIFUNCTION APPARATUS CONTROL SYSTEM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 462 days.

(21) Appl. No.: 13/090,500

(22) Filed: Apr. 20, 2011

(65) Prior Publication Data

US 2011/0261388 A1 Oct. 27, 2011

(30) Foreign Application Priority Data

Apr. 22, 2010 (JP) .................................. 2010-98919

(51) Int. Cl.
*G06K 15/00* (2006.01)
*G06F 3/12* (2006.01)

(52) U.S. Cl.
USPC ........... 358/1.14; 358/1.1; 358/1.15; 715/741

(58) Field of Classification Search
None
See application file for complete search history.

(56) References Cited

U.S. PATENT DOCUMENTS

| 8,256,664 | B1 * | 9/2012 | Balfanz et al. ................ 235/375 |
| 2007/0078994 | A1 * | 4/2007 | Wilson et al. ................ 709/229 |
| 2008/0201578 | A1 * | 8/2008 | Drake ........................... 713/172 |
| 2010/0110472 | A1 * | 5/2010 | Harrington ................... 358/1.15 |
| 2010/0110473 | A1 * | 5/2010 | Harrington ................... 358/1.15 |
| 2011/0058215 | A1 * | 3/2011 | Yoshizumi et al. ........... 358/1.15 |
| 2011/0239124 | A1 * | 9/2011 | Tsujimoto ..................... 715/741 |

FOREIGN PATENT DOCUMENTS

| JP | 2006-277005 A | 10/2006 |
| JP | 2008-287470 A | 11/2008 |

* cited by examiner

*Primary Examiner* — Satwant Singh
(74) *Attorney, Agent, or Firm* — Edwards Wildman Palmer LLP; David G. Conlin; Stephen D. LeBarron

(57) ABSTRACT

An authentication server 2 of the present invention (i) communicates with a multifunction apparatus 1 including a web browser section 15 and (ii) carries out an authentication process for a user who operates the multifunction apparatus 1. The authentication server 2 includes: a user authentication section 25 for (i) obtaining, from the multifunction apparatus 1, login information entered in the multifunction apparatus 1 and (ii) carries out authentication for the user; a second communication section 20 for obtaining Cookie information from the web browser section 15 of the multifunction apparatus 1 with which the authentication of the user, carried out by the user authentication section 25, was successful; and a user information management database 26 for storing the Cookie information received by the second communication section 20. In a case where the authentication of the user, carried out by the user authentication section 25, was successful, the second communication section 20 (i) reads out, from the user information management database 26, Cookie information corresponding to user identification information for identifying the user and (ii) transmits the Cookie information to the multifunction apparatus 1.

16 Claims, 11 Drawing Sheets

FIG. 7

| USER ID | LOGIN NAME | PASSWORD | Cookie INFORMATION |
|---|---|---|---|
| 1 | user1 | pass1 | 1.dat |
| 2 | user2 | pass2 | 2.dat |
| ... | ... | ... | ... |
| N | userN | passN | 3.dat |

FIG. 8

| USER ID | COPYING FUNCTION | SCANNING FUNCTION | FAX SENDING/ RECEIVING FUNCTION | PRINTING FUNCTION | DOCUMENT MANAGEMENT APPLICATION FUNCTION |
|---|---|---|---|---|---|
| 1 | VALID | VALID | VALID | VALID | INVALID |
| 2 | VALID | INVALID | VALID | VALID | VALID |
| ... | ... | ... | ... | ... | ... |
| N | VALID | VALID | VALID | VALID | VALID |

FIG. 9

```
.example.com  /  01 May 2010 09:10:11 GMT  username  user1
.sharp.co.jp  /  03 May 2010 12:34:56 GMT  uid       sharp1
```

```
                                                                    ┌ 54
┌─────────────────────────────────────────────────────────────────┐
│ .example.com   /  01 May 2010 09:10:11 GMT  username  user1     │
│ .sharp.co.jp   /  03 May 2010 12:34:56 GMT  uid       sharp1    │
│ .example.net   /  26 May 2010 14:56:12 GMT  username  user1     │
└─────────────────────────────────────────────────────────────────┘
```

FIG. 17

```
                                                            ╭─55
┌─────────────────────────────────────────────────────────────┐
│ .example.com  /  01 May 2010 09:10:11 GMT  username  user1  │
│ .sharp.co.jp  /  03 May 2010 12:34:56 GMT  uid       sharp1 │
│ .example.org  /  26 May 2010 14:57:38 GMT  username  user1  │
└─────────────────────────────────────────────────────────────┘
```

FIG. 18

```
                                                            ╭─56
┌─────────────────────────────────────────────────────────────┐
│ .example.com  /  01 May 2010 09:10:11 GMT  username  user1  │
│ .sharp.co.jp  /  03 May 2010 12:34:56 GMT  uid       sharp1 │
│ .example.net  /  26 May 2010 14:56:12 GMT  username  user1  │
│ .example.org  /  26 May 2010 14:57:38 GMT  username  user1  │
└─────────────────────────────────────────────────────────────┘
```

AUTHENTICATION SERVER, MULTIFUNCTION APPARATUS, AND MULTIFUNCTION APPARATUS CONTROL SYSTEM

This Nonprovisional application claims priority under 35 U.S.C. §119(a) on Patent Application No. 2010-098919 filed in Japan on Apr. 22, 2010, the entire contents of which are hereby incorporated by reference.

TECHNICAL FIELD

The present invention relates to a multifunction apparatus control system in which an authentication server, a multifunction apparatus, and an information processing apparatus work together.

BACKGROUND ART

A web server uses relatively small text data called "HTTP Cookie (hereinafter, referred to as "Cookie information")" so as to identify a client which accesses the web server. When a user accesses a web site on the web server, the Cookie information is transmitted to a user's web browser, and stored in a hard disc. In a case where the user enters a setting or the like while browsing the web site, Cookie information indicating content of the user's input is stored in the hard disc. When the user accesses the web site via the same web browser again, the Cookie information is automatically transmitted to the web server from the web browser. This allows the web server to identify the client (web browser) which accesses the web server. The use of the Cookie information makes it possible to provide useful functions such as a function of allowing a user to execute an automatic login process from a user's second access to a destination. In recent years, the Cookie information has been therefore considered as an important function that provides a user with a smooth web access.

Further, in recent years, it has become common that a multifunction apparatus (i) has a plurality of functions such as a copying function, a scanning function, a printing function, and a facsimile sending/receiving function and (ii) communicates with a PC (personal computer) or the like via a communication network so as to carry out various processes. That is, it has become common to cause a function of the multifunction apparatus to work with a corresponding application which operates on the PC so that the multifunction apparatus operates as a part of a total application system. This makes it possible to easily provide a flexible service by arbitrarily combining a function of the multifunction apparatus and a corresponding function of the PC with each other.

Note that Patent Literature 1 discloses a technique related to such a system, which technique allows a customized display screen to be shared by a plurality of multifunction apparatuses.

CITATION LIST

Patent Literature

Patent Literature 1
Japanese Patent Application Publication, Tokukai, No. 2006-277005 A (Publication Date: Oct. 12, 2006)

SUMMARY OF INVENTION

Technical Problem

Meanwhile, the Cookie information is information that is stored and managed per web browser of the multifunction apparatus. This gives rise to such a problem that the Cookie information cannot be shared by a plurality of multifunction apparatuses.

The following description deals with a case where a plurality of multifunction apparatuses (e.g. a multifunction apparatus A and a multifunction apparatus B) are provided in a system, for example. In a case where a user (i) causes the multifunction apparatus A to store login information as Cookie information and (ii) enters such a setting that a login process would be omitted from a user's next access, the user can omit the login process only with the multifunction apparatus A from the user's next access but not with the multifunction apparatus B. With the multifunction apparatus B, it is necessary for the user to enter login information again.

The present invention is made in view of the problem. An object of the present invention is to provide an authentication server for constituting a multifunction apparatus control system in which Cookie information can be shared by a plurality of multifunction apparatuses.

Solution to Problem

In order to attain the object, an authentication server of the present invention, which (i) communicates with a multifunction apparatus including a web browser section and (ii) carries out an authentication process for a user who operates the multifunction apparatus, the web browser section carrying out, by sending/receiving data to/from an application which is executed on a web server device, a cooperation process with the application, includes: a user authentication section for carrying out authentication for the user by (i) receiving, from the multifunction apparatus, login information entered in the multifunction apparatus and (ii) checking whether or not the login information matches user authentication information registered in advance; a Cookie information receiving section for receiving Cookie information from the multifunction apparatus with which the authentication of the user, carried out by the user authentication section, was successful, which Cookie information has been transmitted from the web server device to the web browser section; a Cookie information storage section for storing the Cookie information received by the Cookie information receiving section in such a way that the Cookie information and user identification information for identifying the user authenticated by the user authentication section are associated with each other; and a Cookie information sending section for, in a case where the authentication of the user, carried out by the authentication section, was successful, (i) reading out, from the Cookie information storage section, the Cookie information associated with the user identification information for identifying the user and (ii) sending the Cookie information read out from the Cookie information storage section to the multifunction apparatus from which the user authentication section has received the login information.

According to the arrangement, the user authentication section carries out authentication for the user by (i) obtaining, from the multifunction apparatus, the login information entered in the multifunction apparatus and (ii) checking whether or not the login information matches the user authentication information registered in advance. Then, in a case where the authentication of the user, carried out by the user authentication section, was successful, the Cookie information sending section (i) reads out, from the Cookie information storage section, the Cookie information associated with the user identification information for identifying the user and (ii) sending the Cookie information read out from the Cookie information storage section to the multifunction apparatus from which the user authentication section received the login information. After that, in a case where the Cookie information receiving section receives the Cookie information which is transmitted from the web server device to the web browser section of the multifunction apparatus, the Cookie information storage section stores the Cookie information received by the Cookie information receiving section in such a way that the Cookie information and the user identification information for identifying the user authenticated by the user authentication section are associated with each other. As described above, according to the arrangement, the authentication server can (i) collectively carries out the authentication of the user who operates the multifunction apparatus and (ii) manage the Cookie information.

Therefore, it is possible to provide an authentication server which constitutes a multifunction apparatus control system in which Cookie information can be shared by a plurality of multifunction apparatuses.

Advantageous Effects of Invention

As described above, an authentication server of the present invention, which (i) communicates with a multifunction apparatus including a web browser section and (ii) carries out an authentication process for a user who operates the multifunction apparatus, the web browser section carrying out data communication with an application which is executed on a web server device so as to carry out a cooperation process with the application, includes: a user authentication section for carrying out authentication for the user by (i) receiving, from the multifunction apparatus, login information entered in the multifunction apparatus and (ii) checking whether or not the login information matches user authentication information registered in advance; a Cookie information receiving section for receiving Cookie information from the multifunction apparatus with which the authentication of the user, carried out by the user authentication section, was successful, which Cookie information has been transmitted from the web server device to the web browser section; a Cookie information storage section for storing the Cookie information received by the Cookie information receiving section in such a way that the Cookie information and user identification information for identifying the user authenticated by the user authentication section are associated with each other; and a Cookie information sending section for, in a case where the authentication of the user, carried out by the authentication section, was successful, (i) reading out, from the Cookie information storage section, the Cookie information associated with the user identification information for identifying the user and (ii) sending the Cookie information read out from the Cookie information storage section to the multifunction apparatus from which the user authentication section has received the login information.

Therefore, it is possible to provide an authentication server which constitutes a multifunction apparatus control system in which Cookie information can be shared by a plurality of multifunction apparatuses.

BRIEF DESCRIPTION OF DRAWINGS

FIG. 1 is a block diagram illustrating an arrangement of a multifunction apparatus control system in accordance with one embodiment of the present invention

FIG. 2 is a flowchart showing how a login process is carried out in the multifunction apparatus control system illustrated in FIG. 1.

FIG. 3 is a view showing an example of a login screen displayed in S2 shown in FIG. 2.

FIG. 4 is a view showing an example of an external application selection screen.

FIG. 5 is a view showing an example of a print operation screen.

FIG. 6 is a sequence diagram showing details of a process of S2 shown in FIG. 2.

FIG. 7

FIG. 7 is a view showing an example of a user management table stored in a user information management database (DB) illustrated in FIG. 1.

FIG. 8

FIG. 8 is a view showing an example of a function management table stored in the user information management database (DB) illustrated in FIG. 1.

FIG. 9

FIG. 9 is a view showing an example of a Cookie information table stored in the user information management database (DB) illustrated in FIG. 1.

FIG. 10 is a flowchart showing how an external application execution process is carried out in the multifunction apparatus control system illustrated in FIG. 1.

FIG. 11 is a view showing an example of a login screen displayed in S22 shown in FIG. 10.

FIG. 12 is a flowchart showing how a Cookie information transmission process is carried out in the multifunction apparatus control system illustrated in FIG. 1.

FIG. 13 is a flowchart showing details of a process of S38 shown in FIG. 12.

FIG. 14 is a block diagram illustrating an example of an arrangement of the multifunction apparatus control system of the present embodiment.

FIG. 15 is a flowchart showing how a Cookie information updating process is carried out in the multifunction apparatus control system illustrated in FIG. 14.

FIG. 16 is a view showing Cookie information transmitted from a multifunction apparatus to an authentication server.

FIG. 17

FIG. 17 is a view showing Cookie information transmitted from another multifunction apparatus to the authentication server.

FIG. 18

FIG. 18 is a view showing an example of a Cookie information table which is updated on the basis of the Cookie information shown in FIG. 16 and the Cookie information shown in FIG. 17.

FIG. 19 is a flowchart showing a modified example of the login process shown in FIG. 2, carried out in the multifunction apparatus control system.

DESCRIPTION OF EMBODIMENTS

One embodiment of the present invention is described below with reference to FIGS. 1 through 19. The following description deals with one embodiment of a multifunction apparatus control system of the present invention.

[Arrangement of Multifunction Apparatus Control System 100]

Figure 1:
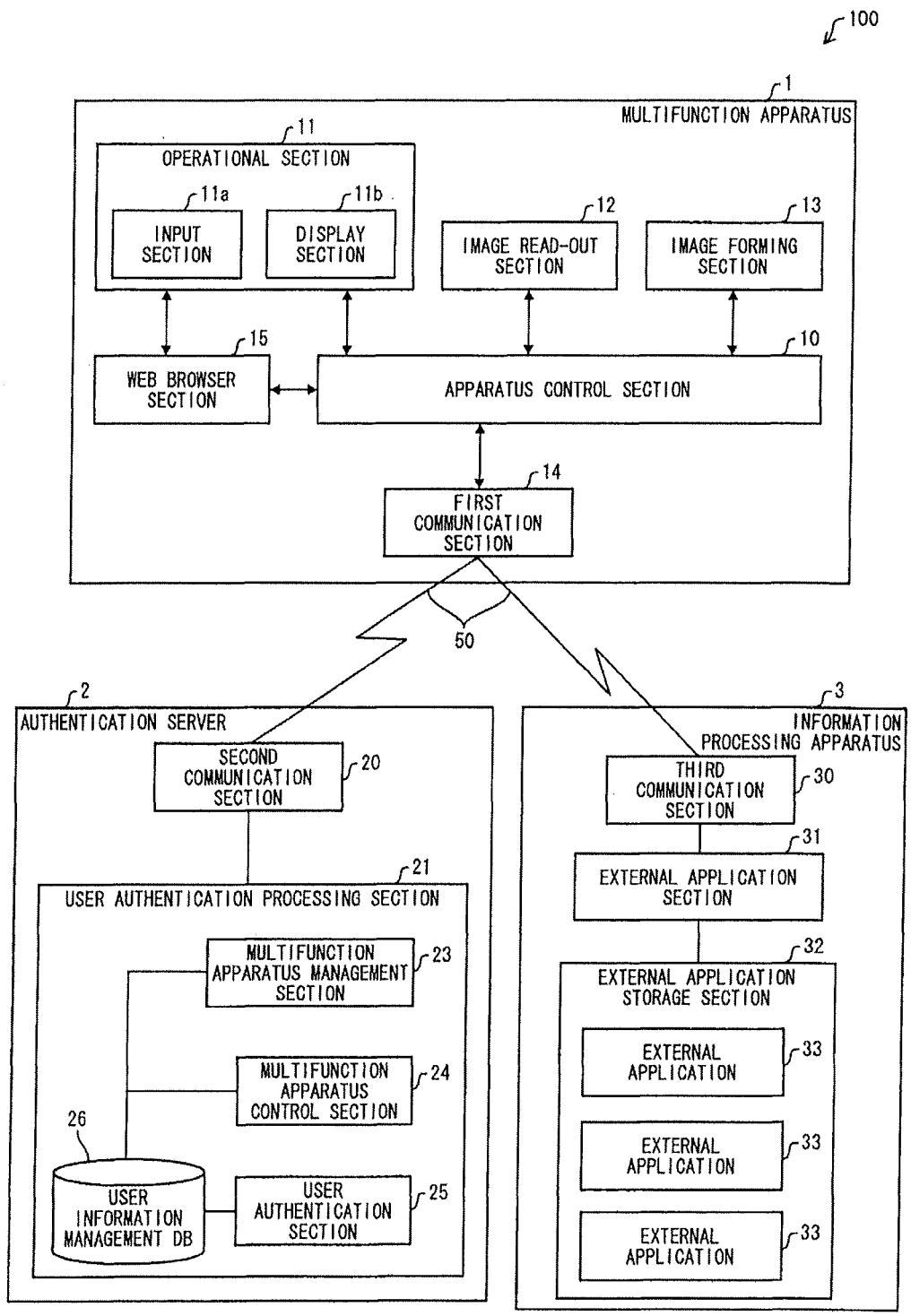
FIG. 1

FIG. 1 is a block diagram illustrating an arrangement of a multifunction apparatus control system 100 of one embodiment of the present invention. The multifunction apparatus control system 100 includes: a multifunction apparatus 1; an authentication server 2; and an information processing apparatus 3 (see FIG. 1). The multifunction apparatus control system 100 employs a communication network 50 via which (i) the multifunction apparatus 1 and the authentication server 2 are communicable with each other and (ii) the multifunction apparatus 1 and the information processing apparatus 3 are communicable with each other.

Examples of the communication network 50 encompass: the Internet; a telephone line; a serial cable, and other wired or wireless communication lines. It is preferable that the multifunction apparatus 1 and the authentication server 2 communicate with each other by use of an XML (extensible markup language), an LDAP (light directory access protocol), an SOAP (simple object access protocol), or the like. This provides a high-speed network communication with fast response time between the multifunction apparatus 1 and the authentication server 2 which collectively manages Cookie information. Further, the multifunction apparatus 1 and the information processing apparatus 3 communicate with each other by use of an HTTP (Hyper Text Transfer Protocol) which is a protocol used in communication between a web server and a web browser (e.g. a request for data of a web site, and transmission of the web site).

As a matter of course, in the multifunction apparatus control system 100, (i) a plurality of multifunction apparatuses 1 can be provided instead of a single multifunction apparatus 1 and (ii) a plurality of information processing apparatuses 3 can be provided instead of a single information processing apparatus 3. Further, it is possible to constitute the authentication server 2 and the information processing apparatus 3 integral with each other as a single device. Alternatively, it is also possible to constitute either the authentication server 2 or the information processing apparatus 3 by installing a corresponding server program a PC. Note that in the present embodiment, an object merely called "application" indicates an application program (application software).

[Configuration of Multifunction Apparatus 1]

The multifunction apparatus 1 is a digital multifunction apparatus or an analogue multifunction apparatus, which (i) receives HTML control information from the information processing apparatus 3 by use of the HTTP and (ii) carries out various functions (e.g. a scanning function, a printing function, or a communicating function) of the multifunction apparatus 1 in accordance with the received HTML control information.

The multifunction apparatus 1 includes: an apparatus control section 10; an operational section 11; an image read-out section 12; an image forming section 13; a first communication section 14; and a web browser section 15.

The operational section 11 is a user interface via which (i) a user is informed of various information and (ii) the multifunction apparatus 1 receives an input from the user. The operational section 11 includes an input section 11a having various input keys, and a display section 11b such as an LCD (Liquid Crystal Display). Note that the operational section 11 can be a touch panel in which the input section 11a and the display section 11b are integrally provided.

The image read-out section 12 includes a scanner, and a sheet feeding section which feeds a sheet to the scanner. The image scanning section 12 scans, as image data, objects (such as characters and images) which are printed on a document. Note that the image scanning section 12 scans an image so that a scanned image has a predetermined resolution.

The image forming section 13 is provided for printing an image (character/photograph/graphic) on a recording sheet such as paper in accordance with inputted image data. The image forming section 13 includes: a photoreceptor drum; a charging device; an exposure device; a developing device; a transfer device; a fixing device; and a sheet tray. Specifically, the image forming section 13 carries out a printing process on the basis of the image data obtained by the image read-out section 12 or image data received from an external device.

The first communication section 14 is an interface via which the multifunction apparatus 1 communicates, via the communication network 50, an external device such as the authentication server 2 or the information processing apparatus 3. According to the present embodiment, the first communication section 14 communicates with the authentication server 2 by use of the SOAP or the like, as described above. Further, the first communication section 14 communicates with the information processing apparatus 3 by use of the HTTP.

The web browser section 15 operates in accordance with software of the web browser. The web browser section 15 communicates with an external application section 31 of the information processing apparatus 3, so as to request data of an operation screen or print data.

The apparatus control section 10 controls each of the sections of the multifunction apparatus 1. Specifically, the apparatus control section 10 controls each of the operations of the sections such as the operational section 11, the image read-out section 12, the image forming section 13, the first communication section 14, and the web browser section 15.

The apparatus control section 10 controls the image read-out section 12 to obtain data of scanned image, for example. Further, the apparatus control section 10 controls the image forming section 13 to (i) form an image indicated by inputted image data on a sheet and (ii) eject the sheet, for example.

Furthermore, the apparatus control section 10 (i) stores inputted image data in a designated external device (e.g. the information processing apparatus 3) via the first communication section 14 or (ii) transmits, to a designated address via the first communication section 14, an e-mail to which the inputted image data is attached.

Further, the apparatus control section 10 transmits, via the first communication section 14, user input information entered via the input section 11a to the authentication server 2 or the information processing apparatus 3.

The multifunction apparatus 1 having such an arrangement receives HTML (Hypertext Markup Language) data indicating an operation screen from the information processing apparatus 3, and causes the operation screen indicated by the HTML data to be displayed, for example. Then, the multifunction apparatus 1 carries out a function corresponding to an instruction entered via the operation screen.

Alternatively, the multifunction apparatus 1 can carry out its function (e.g. the scanning function, the printing function, or the communication function) by executing a control command described in a Java (registered trademark) script in the control information, which is received from the information processing apparatus 3.

Further, the multifunction apparatus 1 employs a user authentication valid mode and a user authentication invalid mode. According to the user authentication valid mode, a user authentication process for identifying a user is carried out when the user starts operating the multifunction apparatus 1. According to the user authentication invalid mode, the user authentication process is not carried out when the user starts operating the multifunction apparatus 1. The user can switch the user authentication valid mode to the user authentication invalid mode, and vice versa.

[Configuration of Authentication Server 2]

Next, the following description deals with a configuration of the authentication server 2. The authentication server 2 (i) carries out the user authentication process for the user who operates the multifunction apparatus 1 and (ii) controls various functions of the multifunction apparatus 1 in accordance with a result of the user authentication process. The authentication server 2 includes a second communication section 20, and a user authentication processing section 21.

The second communication section 20 is an interface via which the authentication server 2 communicates with, via the communication network 50, an external device such as the multifunction apparatus 1. According to the present embodiment, the second communication section 20 communicates with the multifunction apparatus 1 by use of the SOAP or the like, as described above.

The user authentication processing section 21 (i) carries out the user authentication process and (ii) transmits a control command to the multifunction apparatus 1 via the second communication section 20 in accordance with the result of the user authentication process, which control command is used to control a corresponding one of various functions of the multifunction apparatus 1. The user authentication processing section 21 includes: a multifunction apparatus management section 23; a multifunction apparatus control section 24; a user authentication section 25; and a user information management database (DB) 26.

The multifunction apparatus management section 23 identifies a target multifunction apparatus 1 of the user authentication process out of the plurality of multifunction apparatuses 1 connected to the authentication server 2, and manages the target multifunction apparatus 1.

The multifunction apparatus control section 24 controls, per user, which function(s) of the multifunction apparatus 1 is available, on the basis of a function management table 52 (see FIG. 8) in which user's use authority to use each of the various functions of the multifunction apparatus 1 is managed. Further, the multifunction apparatus control section 24 rewrites the function management table 52 in response to a request to modify the function management table 52, which request is received from the multifunction apparatus 1.

The user authentication section 25 carries out the user authentication process on the basis of a user management table 51 (see FIG. 7) so as to identify the user who operates the multifunction apparatus 1.

The user information management database (DB) 26 is a database in which user identification information is managed. The user management table, the function management table, or a Cookie information table is stored in the user information management database (DB) 26. Note that each of such tables will be described later in detail.

[Configuration of Information Processing Apparatus 3]

Next, the following description deals with a configuration of the information processing apparatus 3. The information processing apparatus 3 is a computer device constituted by (i) an arithmetic processing section such as a CPU or a special purpose processor and (ii) a storage section such as an RAM, a ROM, or an HDD. The information processing apparatus 3 functions as a web server device which is shared by a plurality of multifunction apparatuses 1. The information processing apparatus 3 includes a third communication section 30, an external application section 31, and an external application storage section 32.

The third communication section 30 is an interface which communicates with, via the communication network 50, an external device such as the multifunction apparatus 1. According to the present embodiment, the third communication section 30 communicates with the multifunction apparatus 1 by use of the HTTP or the like, as described above.

The external application section 31 carries out an operation in accordance with a predetermined web application. That is, the external application section 31 carries out an operation in accordance with a corresponding one of various web applications which operate on the web server. Such web applications are, custom applications described in, for example, the Java (registered trademark) script, and operates in a Java (registered trademark) script execution environment provided on the web server.

In a case where, for example, the information processing apparatus 3 receives a request for transmission of the operation screen from the multifunction apparatus 1, the external application section 31 operates in accordance with an operation screen transmission application. Specifically, the external application section 31 (i) reads out, from the external application storage section 32, HTML data of the operation screen indicated by the received request and (ii) transmits the HTML data to the multifunction apparatus 1.

Further, in a case where, for example, the information processing apparatus 3 receives a request for storage of scanned data from the multifunction apparatus 1, the external application section 31 operates in accordance with a scan application. Specifically, the external application section 31 (i) obtains the scanned data contained in the request for storage of the scanned data and (ii) stores the scanned data in a folder managed by the external application section 31.

Furthermore, in a case where, for example, the information processing apparatus 3 receives a request for transmission of print data from the multifunction apparatus 1, the external application section 31 operates in accordance with a print application. Specifically, the external application section 31 (i) obtains, from a folder whose folder name is designated by the request for transmission of print data, print data whose file name is designated by the request for transmission of print data and (ii) transmits the print data to the multifunction apparatus 1.

The external application storage section 32 stores various external applications 33 for controlling the multifunction apparatus 1.

As described above, the multifunction apparatus control system 100 includes the multifunction apparatus 1, the authentication server 2, and the information processing apparatus 3. The multifunction apparatus 1 transmits, to the authentication server 2, login information entered via the input section 11a. This allows the multifunction apparatus 1 and the authentication server 2 work together so as to carry out the user authentication process.

Further, the multifunction apparatus 1 transmits device information or the like to the authentication server 2. Here, the device information is identification information which (i) is inherent in that device and (ii) is used to distinguish that device from other devices. As an example, the device information of the multifunction apparatus 1 is identification information for distinguishing the multifunction apparatus 1 from other devices (such as other multifunction apparatuses or the authentication server 2), such as a device number (serial number) inherent in the multifunction apparatus 1 or a MAC (Media Access Control) address inherent in the multifunction apparatus 1. The authentication server 2 can identify, with the device information, the target of the user authentication process or the target whose function is to be controlled.

Furthermore, the multifunction apparatus 1 causes the information processing apparatus 3 to start a function of the external application 33 (hereinafter, referred to as "external application function"), and obtains a result of a process of the function. The external application functions correspond to external applications 33 stored in the information processing apparatus 3, one by one. It is possible to provide the multifunction apparatus 1 with, for each of the external applications 33 stored in the information processing apparatus 3, a corresponding one of the external application functions.

Here, the multifunction apparatus 1 and the external application section 31 can communicate with each other on the basis of a standard network technique. Therefore, a lot of general tools and skills are applicable to the development of a collaboration part of the apparatus control section 10 (firmware in the apparatus control section 10) and the external application section 31. Accordingly, it is easy to provide the multifunction apparatus 1 with the external application functions, and it is possible to reduce cost in development of the collaboration part. Note that this also applies to the foregoing communication between the multifunction apparatus 1 and the user authentication processing section 21.

[Login Process]

Figure 2:
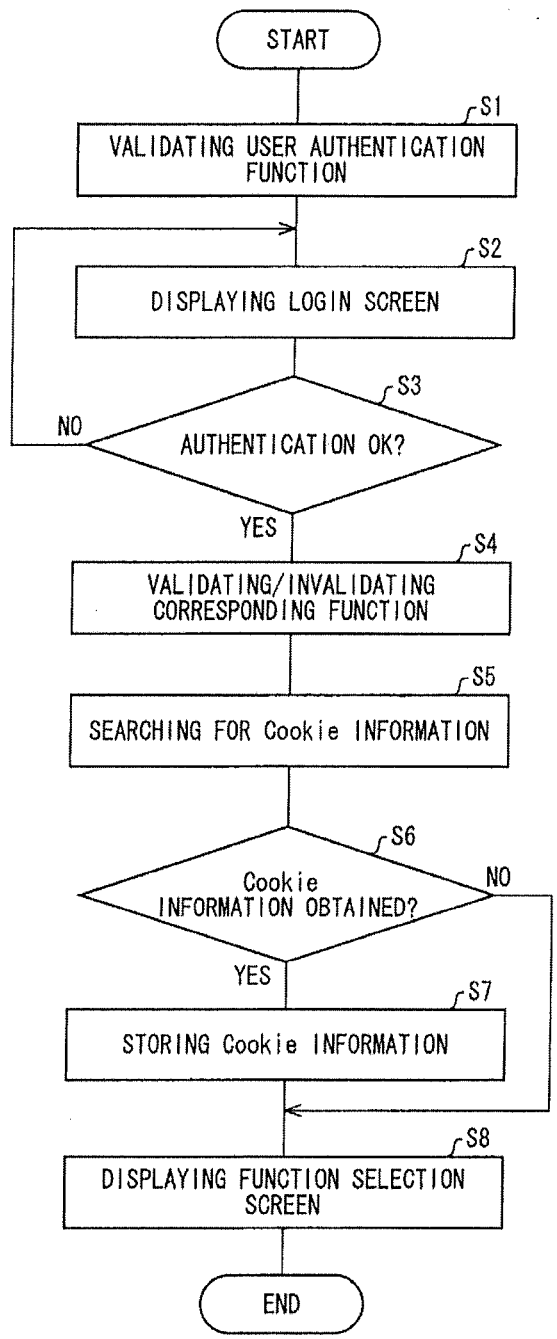
FIG. 2

Next, the following description explains how the login process is carried out in the multifunction apparatus control system 100 with reference to FIG. 2. FIG. 2 is a flowchart showing how the login process is carried out in the multifunction apparatus control system 100. A first step of the login process in which the multifunction apparatus 1 and the authentication server 2 work together is validation of a user authentication function of the multifunction apparatus 1 (S1) (see FIG. 2). Specifically, the apparatus control section 10 switches over the user authentication mode of the multifunction apparatus 1 from the user authentication invalid mode to the user authentication valid mode in accordance with a user's instruction entered via the operational section 11. Note that in a case where the user authentication mode of the multifunction apparatus 1 has been already set to the user authentication valid mode, the step S1 is omitted.

When the user authentication function is validated, the apparatus control section 10 accesses the authentication server 2 so as to request data of a login screen (authentication screen). In response to the request, the user authentication processing section 21 transmits the data of the login screen to the apparatus control section 10. On receipt of the data of the login screen, the apparatus control section 10 causes the display section 11b to display the login screen on the basis of the data of the login screen (S2). Note that the process of S2 will be described later in detail.

Figure 3:
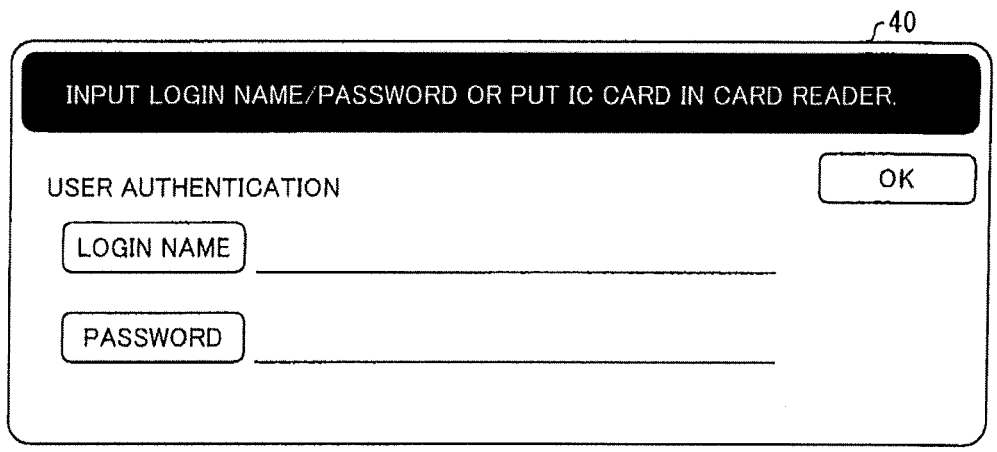
FIG. 3

FIG. 3 is a view showing an example of a login screen 40 displayed in S2 shown in FIG. 2. Login information such as a login name and a password can be entered via the login screen 40 (see FIG. 3). Further, in a case where the multifunction apparatus 1 is the one which can accept entering of the login information by use of an IC (Integrated Circuit) card or the like, a message such as a sentence urging the user to put the IC card into a card reader is additionally displayed in the login screen 40.

In a case where (i) the login name and the password are entered via the login screen 40 and (ii) an "OK" button displayed in the login screen 40 is pressed, the apparatus control section 10 transmits the entered login information to the authentication server 2. On receipt of the login information, the user authentication section 25 of the authentication server 2 (i) carries out the user authentication process with respect to the received login information and (ii) judges whether or not the user authentication process was successful (S3). Note that the process of S3 will be described later in detail.

In a case where it is judged that the user authentication process was not successful (NO in S3), the user authentication section 25 sends back a result of the judgment of the user authentication process to the multifunction apparatus 1. On receipt of the result, the apparatus control section 10 causes the display section 11b to display a login screen on the basis of data of the login screen, which is transmitted with the result of the judgment (alternatively, the apparatus control section 10 causes the display section 11b to continuously display the login screen shown in FIG. 3, stored in the multifunction apparatus 1, until the user authentication process becomes successful), so as to urge the user to reenter the login information.

On the other hand, in a case where it is judged that the user authentication process was successful (YES in S3), the user authentication section 25 transmits the result of the judgment of the user authentication process to the multifunction apparatus control section 24. On receipt of the result, the multifunction apparatus control section 24 generates (i) a control command for clearing the login screen displayed by the display section 11b and (ii) a function control command on the basis of user's use authority to use each of various functions of the multifunction apparatus 1, the user's use authority being obtained on the basis of the function management table 52 (see FIG. 8). The multifunction apparatus control section 24 transmits the control command and the function control command to the multifunction apparatus 1. In response to these control commands, the apparatus control section 10 (i) clears the login screen and (ii) validates or invalidates each of the functions of the multifunction apparatus 1 (S4). Note that the process of S4 will be described later in detail.

Further, the multifunction apparatus control section 24 searches for a Cookie information file from among the user management table 51 (S5), which Cookie information file has been stored in the user management table 51 in such a way that the Cookie information file and a user ID are associated with each other. Then, the multifunction apparatus control section 24 judges whether or not the Cookie information was obtained (S6).

In a case where it is judged that the Cookie information was obtained (YES in S6), the multifunction apparatus control section 24 (i) generates a control command for causing the web browser section 15 to store the Cookie information and (ii) transmits the control command with the Cookie information to the multifunction apparatus 1. In response to the control command with the Cookie information, the apparatus control section 10 causes the web browser section 15 to store the Cookie information in accordance with the control command (S7).

As described above, after the user authentication process is carried out in the login process, the authentication server 2 transmits the Cookie information to the multifunction apparatus 1 so as to cause the web browser section 15 to store the Cookie information.

On the other hand, in a case where it is judged that the Cookie information was not obtained (NO in S6), the multifunction apparatus control section 24 transmits the result of the judgment to the multifunction apparatus 1. For example, in a case where the user uses the multifunction apparatus 1 for the first time, no Cookie information has been stored for the user in the authentication server 2. In such a case, the step S7 is omitted.

Then, the apparatus control section 10 causes the display section 11*b* to display a function selection screen (S8). The function selection screen is a screen displayed after the user's login, via which screen one of the functions of the multifunction apparatus 1 can be selected. In the function selection screen, only the function(s) that was validated in S4 on the basis of the user's use authority is displayed so that the user can select one of such function(s).

Figure 4:
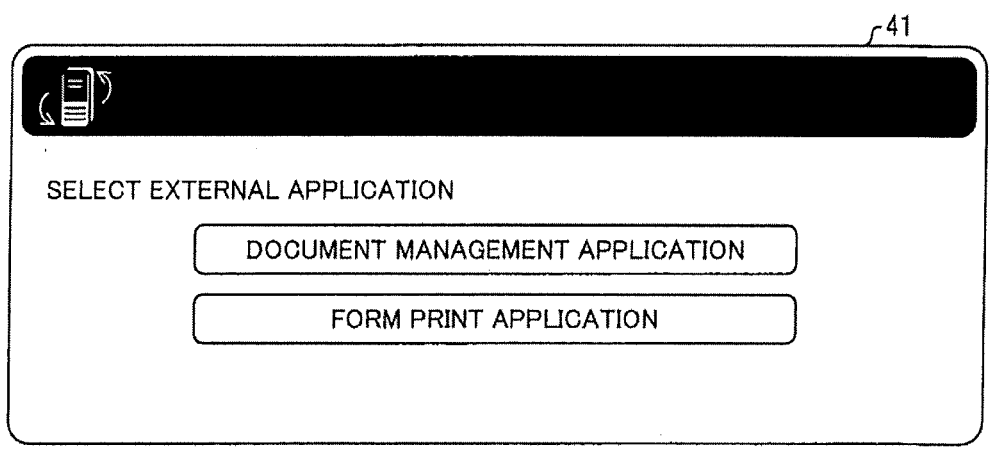
FIG. 4

In a case where the user selects a target external application function via the function selection screen displayed in S8, an external application selection screen 41 shown in FIG. 4 is displayed, for example.

FIG. 4 is a view showing an example of the external application selection screen 41. In the external application selection screen 41, external applications 33 are displayed so that the user can select one of corresponding ones of the external applications 33, i.e. "document management application" and "account print application" (see FIG. 4).

Figure 5:
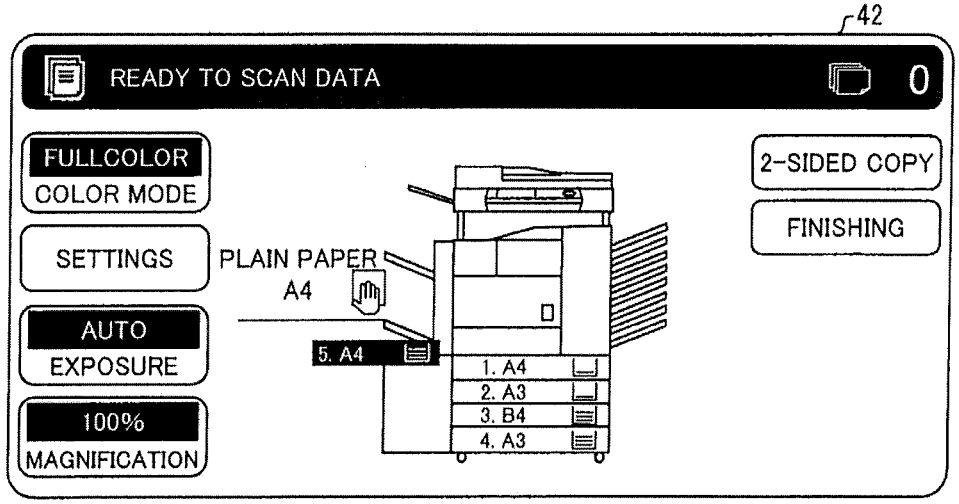
FIG. 5

Further, in a case where the user selects a copying function via the function selection screen displayed in S8, a print operation screen 42 shown in FIG. 5 is displayed, for example.

FIG. 5 is a view showing an example of the print operation screen 42. In the print operation screen 42, print conditions are displayed so that the user can set the print conditions (see FIG. 5). The user can enter a desired print condition(s) so as to carry out the printing.

[Details of Process of S2]

Figure 6:
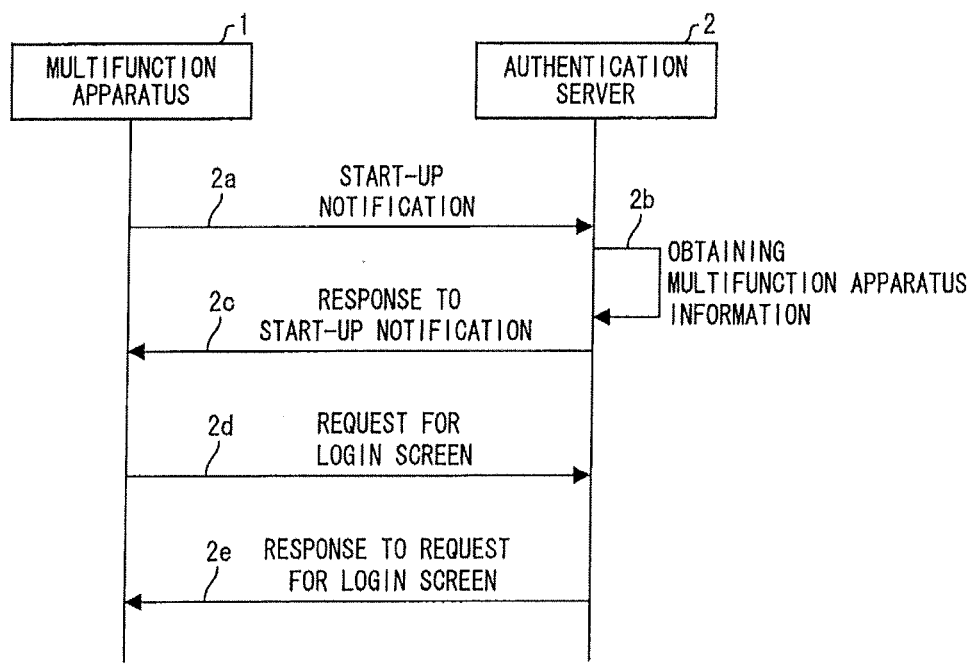
FIG. 6

Next, the following description deals with details of the process of S2 shown in FIG. 2 with reference to FIG. 6. FIG. 6 is a sequence diagram showing details of the process of S2 shown in FIG. 2. As described above, the login screen 40 shown in S2 is transmitted from the authentication server 2 to the multifunction apparatus 1. Note, however, that it is necessary to cause the authentication server 2 to recognize the multifunction apparatus 1 as a target of the user authentication process, in order to transmit the login screen 40 from the authentication server 2 to the multifunction apparatus 1.

For this reason, when the user authentication function is validated in S1 shown in FIG. 2, the apparatus control section 10 transmits a start-up notification to the authentication server 2, which start-up notification contains (i) information indicating that the user authentication function is valid and (ii) device information of the multifunction apparatus 1 (S2*a*). Note that data transmission from the multifunction apparatus 1 to the authentication server 2, including the foregoing transmission of the start-up notification, is carried out such that (i) the apparatus control section 10 instructs the first communication section 14 to transmit data to the authentication server 2 and (ii) the second communication section 20 of the authentication server 2 receives the data.

Further, the process of S2*a* is also carried out at timing when the multifunction apparatus 1 is started up, provided that the user authentication function is valid when the multifunction apparatus 1 is started up. In this case, the start-up notification containing the device information of the multifunction apparatus 1 is transmitted to the authentication server 2.

On the other hand, in a case where the user authentication function of the multifunction apparatus 1 is switched over from the valid state to the invalid state, the authentication server 2 receives a start-up notification which contains (i) information indicating that the user authentication function is invalid and (ii) the device information of the multifunction apparatus 1. This causes the authentication server 2 to recognize that the multifunction apparatus 1 becomes no longer the target of the user authentication process.

On receipt of the start-up notification from the multifunction apparatus 1 in S2*a*, the multifunction apparatus management section 23 obtains multifunction apparatus information of the multifunction apparatus 1 from an internal memory (an internal memory of the authentication server 2) by using, as a key, the device information contained in the start-up notification (S2*b*). Here, the multifunction apparatus information is management information of a corresponding one of the plurality of multifunction apparatuses managed by the authentication server 2. The multifunction apparatus information contains: the device information of the multifunction apparatus; information indicating ON/OFF of a power supply of the multifunction apparatus; information indicating validity/invalidity of the user authentication function of the multifunction apparatus; and/or information indicating whether or not the multifunction apparatus is the target of the user authentication process. In a case where the multifunction apparatus management section 23 detects a switchover of the user authentication function of the multifunction apparatus 1 from the invalid state to the valid state on the basis of the start-up notification received from the multifunction apparatus 1, the multifunction apparatus management section 23 rewrites the multifunction apparatus information of the multifunction apparatus 1, stored in the internal memory, so that the user authentication function of the multifunction apparatus information is rewritten as being not in the invalid state but in the valid state. That is, the multifunction apparatus management section 23 rewrites the multifunction apparatus information so that the multifunction apparatus 1 becomes the target of the user authentication process.

Further, in a case where the multifunction apparatus management section 23 detects a switchover of the power supply of the multifunction apparatus 1 from the OFF state to the ON state on the basis of the start-up notification received from the multifunction apparatus 1, the multifunction apparatus management section 23 carries out the following (I) or (II), provided that the user authentication function has been already validated: (I) the multifunction apparatus management section 23 rewrites the multifunction apparatus information so that the multifunction apparatus 1 becomes the target of the user authentication process; or (II) the multifunction apparatus management section 23 creates multifunction apparatus information on the basis of the device information of the multifunction apparatus 1 so that the multifunction apparatus 1 is newly added as the target of the user authentication process. Such a process allows the multifunction apparatus management section 23 to recognize the multifunction apparatus 1 as the target of the user authentication process.

Next, in response to the start-up notification, the multifunction apparatus management section 23 sends back, to the multifunction apparatus 1 via the second communication section 20, a response (e.g. information indicating that it was confirmed that (i) the user authentication function is in an ON state and (ii) the multifunction apparatus 1 was started up) (S2*c*). Note that data transmission from the authentication server 2 to the multifunction apparatus 1, including the foregoing transmission of the response, is carried out such that (i) the multifunction apparatus management section 23 instructs the second communication section 20 to transmit data to the multifunction apparatus 1 and (ii) the first communication section 14 of the multifunction apparatus 1 receives the data.

On receipt of the response in S2*c*, the apparatus control section 10 requests the authentication server 2 to transmit data of the login screen 40 shown in FIG. 3 (Step S2*d*). In response to the request, the multifunction apparatus management section 23 (i) reads out the data of the login screen 40 from the internal memory of the authentication server 2 and (ii) causes the data of the login screen 40 to be transmitted to the multifunction apparatus 1 (S2e). On receipt of the data of the login screen 40, the apparatus control section 10 causes the display section 11b to display the login screen 40 on the basis of the received data of the login screen 40. In this manner, the process of the step S2 shown in FIG. 2 is completed.

[Details of Process of S3]

Next, the following description deals with details of the process of S3 shown in FIG. 2 with reference to FIG. 7. FIG. 7 is a view showing an example of the user management table 51 stored in the user information management database (DB) 26 illustrated in FIG. 1. As shown in FIG. 7, a login name, a password, and a Cookie information file name are managed as the user identification information per user ID in the user management table 51. The user ID, the login name, the password, and the Cookie information file name are associated with each other in the user management table 51.

When the user starts operating the multifunction apparatus 1 and enters the login information, the entered login information is transmitted, as the user input information, from the multifunction apparatus 1 to the authentication server 2. On receipt of the login information, the user authentication section 25 checks the user management table 51 so as to find the user identification information that corresponds to the login information.

In a case where there is no user identification information that corresponds to the login information in the user management table 51, the user authentication section 25 (i) judges that the user authentication process was unsuccessful (NO in S3) and (ii) sends back the result of the judgment of the user authentication process to the multifunction apparatus 1. Upon receipt of the result, the apparatus control section 10 causes the display section 11b to display the login screen on the basis of the data of the login screen so as to urge the user to re-enter the login information (alternatively, the apparatus control section 10 causes the display section 11b to continuously display the login screen 40 shown in FIG. 3, stored in the multifunction apparatus 1, until the user authentication process becomes successful). Note that data of the login screen is transmitted with the result of the user authentication process.

On the other hand, in a case where there is the user identification information that corresponds to the login information in the user management table 51, the user identification section 25 (i) judges that the user authentication process was successful (YES in S3) and (ii) transmits the result of the user authentication process to the multifunction apparatus control section 24. In this manner, the multifunction apparatus 1 can work with the authentication server 2 so as to carry out the user authentication process.

[Details of Process of S4]

Next, the following description deals with details of the process of S4 shown in FIG. 2 with reference to FIG. 8. FIG. 8 is a view showing an example of the function management table 52 stored in the user information management database (DB) 26 illustrated in FIG. 1. The function management table 52 manages, per user ID, user's use authority with respect to each of various functions (elemental functions) of the multifunction apparatus 1 (see FIG. 8). That is, the function management table 52 manages available function(s) of the multifunction apparatus 1 per user. In the function management table 52, (i) a function to which the user has use authority is indicated as "valid" and (ii) a function to which the user has no use authority is indicated as "invalid". In a case of a user whose user ID is "1", for example, "copying function", "scanning function", "fax sending/receiving function", and "printing function" are indicated as being "valid". That is, the user having the user ID of "1" has the use authority to these functions, and can use these functions. In contrast, "document management application function" is indicated as being "invalid". That is, the user having the user ID of "1" does not have the use authority to "document management application function", and cannot use "document management application function".

In a case where it is judged that the user authentication process was successful (YES in S3), the multifunction apparatus control section 24 looks up the function management table 52 on the basis of the login information so as to read out, for the user indicated by the login information, the user's use authority with respect to each of the functions of the multifunction apparatus 1. Specifically, the multifunction apparatus control section 24 searches for, by use of the foregoing user ID as a key, a user ID that is identical with the foregoing user ID, from among the function management table 52, so as to read out the corresponding user's use authority.

Then, the multifunction apparatus control section 24 creates a control command on the basis of the read-out user's use authority. Specifically, the multifunction apparatus control section 24 creates a function control command which (i) validates the function(s) of the multifunction apparatus 1, which function(s) is indicated as being "valid" in the function management table 52 and (ii) invalidates the other function(s) of the multifunction apparatus 1, which function(s) is indicated as being "invalid" in the function management table 52. Then, the multifunction apparatus control section 24 transmits the created function control command to the multifunction apparatus 1. On receipt of the function control command, the apparatus control section 10 validates/invalidates each of the functions of the multifunction apparatus 1 in accordance with the function control command.

As described above, the multifunction apparatus control section 24 creates the function control command on the basis of the function management table 52, and transmits the function control command to the multifunction apparatus 1. On receipt of the function control command, the apparatus control section 10 controls the functions of the multifunction apparatus 1 in accordance with the function control command. Therefore, it is possible to allow the user to use a corresponding one(s) of the various functions of the multifunction apparatus 1 within the user's use authority.

Further, upon receipt of a request to rewrite the function management table 52 from the multifunction apparatus 1, the multifunction apparatus control section 24 rewrites the use authority information of any of the functions of the multifunction apparatus 1, which use authority is managed in the function management table 52. In this case, the multifunction apparatus control section 24 accepts the request to rewrite the function management table 52 only when receiving, from the multifunction apparatus 1, login information of a specific user, e.g. login information of an administrator. This prevents content of the function management table 52 from being re-written without permission.

The function management table 52 manages the functions of the multifunction apparatus 1 by roughly categorizing the functions into "copying function". "scanning function", "facsimile sending/receiving function", "printing function", "document management application function", and the like (here, functions are categorized according to their operation modes). Note, however, that the present invention is not limited to the arrangement. In the case of, for example, "scanning function", it is possible to (i) further categorize "scanning function" into more detailed functions such as "function of scanning and transmitting data via E-mail" and "function of scanning and transmitting data by use of FTP (File Transfer Protocol)" and (ii) manage the user's use authority with respect to each of the detailed functions. Alternatively, different categories, such as "color information (black-and-white/full color)", may be used to manage the user's use authority.

Here, the function management table 52 also manages user's use authority with respect to an external application function. For example, "document management application function" is a function that works with a document management application which is stored in the information processing apparatus 3 as one of the external applications 33. That is, the function management table 52 can manage not only user's use authority with respect to internal functions of the multifunction apparatus 1 but also user's use authority with respect to external application functions. In this case, the function management table 52 manages the user's use authority per external application function, that is, per external application 33. The external applications 33 are stored in the information processing apparatus 3 so that the external applications 33 are executable by a combination of the information processing apparatus 3 and the multifunction apparatus 1. Further, it is also possible to categorize the external application function into more detailed functions, such as settings of each of the external applications 33, and manage the user's use authority with respect to each of such settings.

Furthermore, as to a function that may be used as either the internal function of the multifunction apparatus 1 or the external application function, such as "printing function", it is possible to manage the user's use authority with respect to "printing function" per combination of the functions. For example, it is possible to manage the user' use authority with respect to the printing function such that user's use authority with respect to the printing function by use of the internal function of the multifunction apparatus 1 and user's use authority with respect to the printing function by use of the external application function are independently managed. As a matter of course, it is possible to manage, in the function management table 52, only the user's use authority with respect to the internal functions of the multifunction apparatus 1.

As described above, according to the authentication server 2, it is possible to control the operations of the multifunction apparatus 1 by managing, per user, (i) the use authority with respect to the internal functions of the multifunction apparatus 1 (such as "copying function", "scanning function", "faxing function", and "printing function") and (ii) the use authority with respect to the external application functions.

[Details of Process of S6]

Next, the following description deals with details of the process of S6 shown in FIG. 2. As described above, the Cookie information is stored in the user information management database (DB) 26. In the user management table 51, the Cookie information is stored in a single file per user ID (see FIG. 7). In FIG. 7, for example, "1.dat" indicates that the Cookie information corresponding to the user ID of "1" is stored in a file whose name is "1.dat". That is, the user ID is added to the file name of the Cookie information. Accordingly, by checking the file name of the Cookie information, it is possible to identify which user corresponds to the Cookie information.

In S5 shown in FIG. 2, the multifunction apparatus control section 24 searches for, from among the user management table 51, a Cookie information file that has been stored in the user management table 51 in such a way that the Cookie information file and the user ID are associated with each other (S5). Then, the multifunction apparatus control section 24 judges whether or not the Cookie information file was obtained (S6).

FIG. 9 is a view showing an example of the Cookie information table 53 stored in the user information management database (DB) 26 illustrated in FIG. 1. Note that the Cookie information table 53 exemplifies the one having the file name of "1.dat" shown in FIG. 7. As shown in FIG. 9, the Cookie information is constituted by a pair of a name and a value, and other several parameters. In the present example, neighboring parameters are separated from each other by a tab. For example, data in a first line is such that (i) ".example.com" at a first column is a domain name (ii) "/" at a second column is a file path (iii) "1 May 2010 09:10:11" at a third column is an expiration date (iv) "username" at a fourth column is a name of a key for specifying information that is caused to be stored by software on the web server and (v) "user 1" at a fifth column is a value allocated to the key at the fourth column.

[External Application Execution Process]

Figures 10, 11:
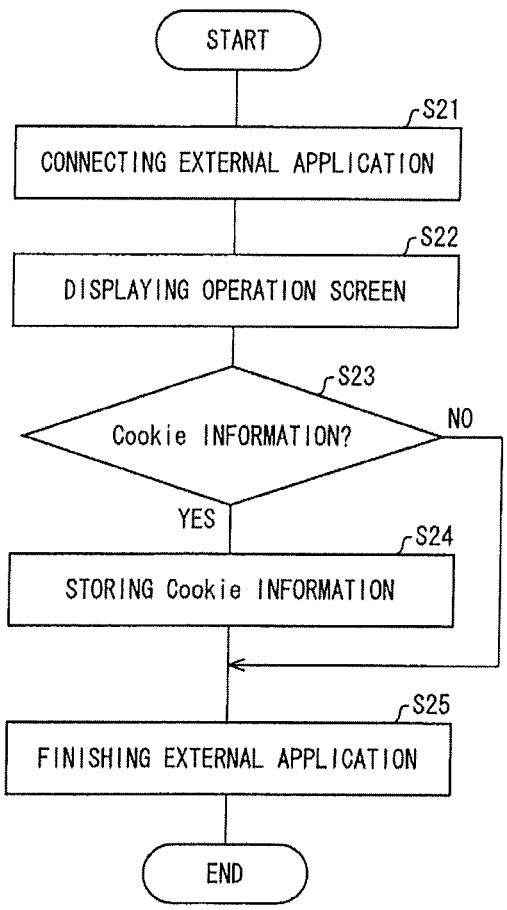
FIG. 10
FIG. 11

Next, the following description deals with how an external application execution process is carried out in the multifunction apparatus control system 100 with reference to FIG. 10, which external application execution process is carried out after the foregoing login process shown in FIG. 2 is carried out. Note that the multifunction apparatus 1 and the information processing apparatus 3 work together so as to carry out the external application execution process.

FIG. 10 is a flowchart showing how the external application execution process is carried out in the multifunction apparatus control system 100. In a case where a specific external application function is selected via the external application selection screen shown in FIG. 4, the apparatus control section 10 requests the information processing apparatus 3 to transmit data defining an operation screen of the selected external application 33, such as HTML (Hypertext Markup Language) data (S21) (see FIG. 10).

In response to the request, the external application section 31 (i) obtains the requested HTML data from the external application storage section 32 and (ii) transmits the HTML data to the multifunction apparatus 1. On receipt of the HTML data, the apparatus control section 10 transmits the received HTML data to the web browser section 15, and the web browser section 15 causes the display section 11b to display the operation screen on the basis of the HTML data (S22).

FIG. 11 is a view showing an example of a login screen 43 displayed in S22 shown in FIG. 10. In a case where the user selects "document management application", the login screen 43 of the document management application is displayed in S22 (see FIG. 11). Here, in a case where an item of "omit input of login information from the next access" is ticked (YES in S23), it becomes necessary for the external application section 31 to cause the web browser section 15 to store Cookie information containing the information on the omission. Therefore, the external application section 31 transmits, to the multifunction apparatus 1, HTML data of the next operation screen, to which the Cookie information is added, so as to cause the web browser section 15 to store the Cookie information (S24). In this manner, when the external application is executed, the web browser section 15 stores the Cookie information in response to the request received from the external application section 31.

Then, after the process of "document management application" is finished, the user finishes the process employing the external application 33 (S25), and logs out.

As described above, the user (i) carries out the login process, and then (ii) operates the input section 11a of the multifunction apparatus 1 so as to carry out the copying function, the scanning function, or the external application function, after that (iii) carries out a logout process.

[Logout Process]

Next, the following description deals with how a logout process is carried out in the multifunction apparatus control system 100. The logout process carried out in the multifunction apparatus control system 100 is mainly constituted by a Cookie information transmission process and a Cookie information updating process. First, the Cookie information transmission process is described below with reference to FIG. 12.

Figure 12:
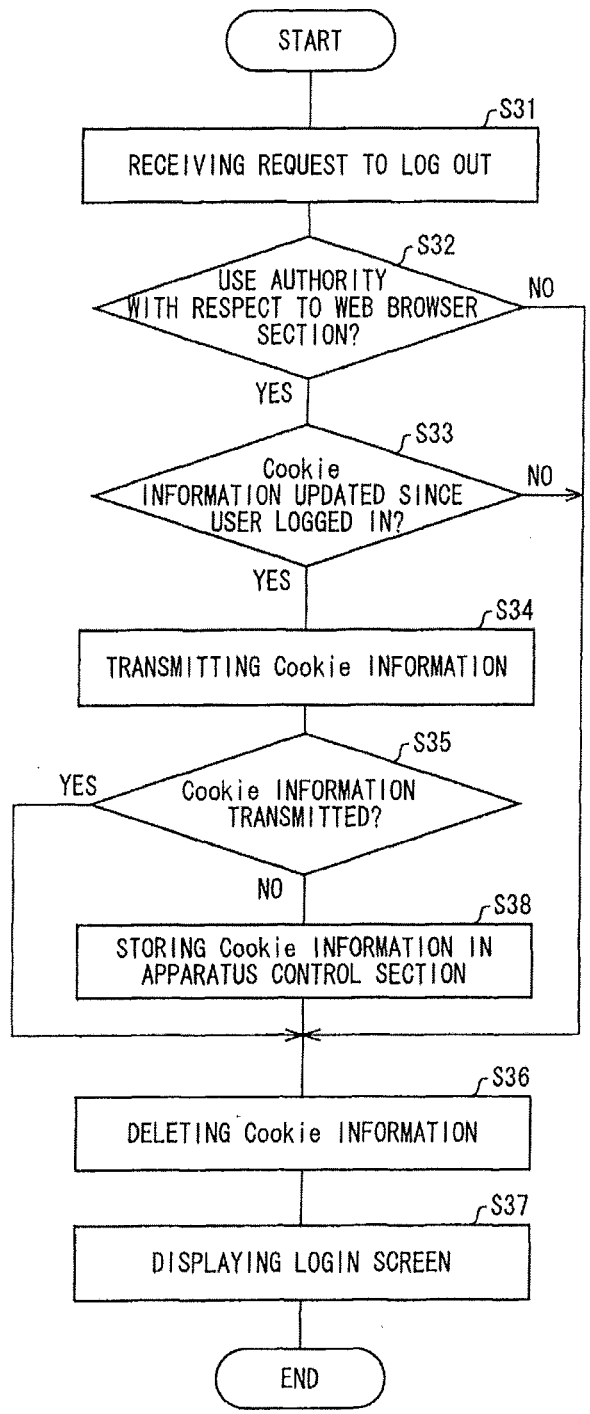
FIG. 12

FIG. 12 is a flowchart showing how the Cookie information transmission process is carried out by the multifunction apparatus 1. After executing the desired process by use of the multifunction apparatus 1, the user enters a logout request via the input section 11*a* (S31) (see FIG. 12). Note that the logout process is also carried out (i) when the apparatus control section 10 detects no input operation via the input section 11*a* at timing when a job is finished or a predetermined time period elapses or (ii) when a login request is received from another user.

In a case where the Cookie information is updated on the basis of the user's operation during a time period from the user's login to the user's logout, the external application section 31 causes the web browser section 15 to store the updated Cookie information as described above. Then, the apparatus control section 10 transmits the Cookie information stored in the web browser section 15 to the authentication server 2 when the user logs out.

Here, in a case where the user has not used the web browser section 15 during a time period from the user's login to the user's logout, the Cookie information stored in the web browser section 15 is not changed. In this case, it is preferable that the multifunction apparatus 1 does not transmit the Cookie information to the authentication server 2 for the sake of (i) a reduction in network traffic (ii) elimination of a standby time period for the transmission of the Cookie information and (iii) a reduction in load of the authentication server 2. In order to achieve such advantages, in a case where a logout request is entered, the apparatus control section 10 carries out update judgment so as to judge whether or not the web browser section 15 was updated during the time period from the user's login to the user's logout.

The update judgment includes the following plurality of steps. First, the apparatus control section 10 judges whether or not the user who has logged in has the use authority with respect to the web browser section 15 (S32). This is because, in a case where the user has no use authority with respect to the web browser section 15, the web browser section 15 would not be used, and the Cookie information would not be updated. Specifically, the apparatus control section 10 analyzes the function control command received from the multifunction apparatus control section 24 so as to judge whether or not the user has the use authority with respect to the web browser section 15, which function control command is created on the basis of the user's use authority with respect to each of the functions of the multifunction apparatus 1.

In a case where it is judged that the user has no use authority with respect to the web browser section 15 (NO in S32), the apparatus control section 10 does not transmit the Cookie information to the authentication server 2. In the case of the function management table 52 shown in FIG. 8, for example, the use authority with respect to "document management application function" is "invalid" for the user having the user ID of "1". In this case, the apparatus control section 10 (i) judges that the user having the user ID of "1" has no use authority with respect to the web browser section 15 and (ii) instructs the web browser section 15 to delete the Cookie information without transmitting the Cookie information to the authentication server 2 (S36). As described above, by deleting the Cookie information stored in the web browser section 15, it becomes possible to significantly reduce an internal memory capacity ensured for the Cookie information in the multifunction apparatus 1.

After that, the apparatus control section 10 carries out a process for clearing the operation screen, and causes the login screen 40 shown in FIG. 3 to be displayed (S37).

On the other hand, in a case where it is judged that the user has the use authority with respect to the web browser section 15 (YES in S32), the apparatus control section 10 carries out the following update judgment. In the case of the function management table 52 shown in FIG. 8, for example, the use authority with respect to "document management application function" is "valid" for the user having a user ID of "2". In this case, the apparatus control section 10 judges that the user having the user ID of "2" has the use authority with respect to the web browser section 15.

However, the judgment that the user has the use authority with respect to the web browser section 15 does not necessarily means that the user has used the web browser section 15. For example, the user might execute only the copying function of the multifunction apparatus 1 before the user logs out. In such a case, the external application such as "document management application" is not used so that the Cookie information is not updated.

In this regard, the apparatus control section 10 judges whether or not the Cookie information stored in the web browser section 15 was updated by the actual use of the external application function by the user (S33). Specifically, the apparatus control section 10 (i) stores the Cookie information that is received from the authentication server 2 when the user logs in and (ii) compares the Cookie information with Cookie information that is received when the user logs out. Alternatively, the apparatus control section 10 can carry out the judgment in such a manner that (i) when the web browser section 15 updates the Cookie information, the update is indicated by use of an update flag and (ii) the apparatus control section 10 checks the update flag so as to carry out the judgment.

In a case where it is judged that the Cookie information was not updated (NO in S33), the apparatus control section 10 instructs the web browser section 15 to delete the Cookie information (S36).

After that, the apparatus control section 10 carries out the process for clearing the operation screen, and causes the login screen 40 shown in FIG. 3 to be displayed (S37).

On the other hand, in a case where it is judged that the Cookie information was updated (YES in S33), the apparatus control section 10 causes the Cookie information to be transmitted to the authentication server 2 (S34).

Next, the apparatus control section 10 judges whether or not the transmission of the Cookie information to the authentication server 2 was successful (S35). In a case where it is judged that the transmission of the Cookie information was successful (YES in S35), the apparatus control section 10 instructs the web browser section 15 to delete the Cookie information (S36).

Then, the apparatus control section 10 carries out the process for clearing the operation screen, and causes the login screen 40 shown in FIG. 3 to be displayed (S37).

On the other hand, in a case where it is judged that the transmission of the Cookie information was unsuccessful (NO in S35), the apparatus control section 10 makes a copy of the Cookie information stored in the web browser section 15

(S38), and temporarily stores the copy of the Cookie information in a memory (not illustrated) or the like provided for the apparatus control section 10. Note that the process of S38 will be described later in detail.

After that, the apparatus control section 10 instructs the web browser section 15 to delete the Cookie information (S36).

Then, the apparatus control section 10 carries out the process for clearing the operation screen, and causes the login screen 40 shown in FIG. 3 to be displayed (S37).

As described above, the multifunction apparatus 1 transmits the updated Cookie information to the authentication server 2. This makes it possible to (i) reduce the network traffic (ii) make it unnecessary to ensure the standby time period for the transmission of the Cookie information and (iii) reduce a load of the authentication server 2, e.g. a load of receiving and updating the Cookie information. Further, it is possible to rewrite, into the newest Cookie information, the Cookie information related to the user who has logged in, which Cookie information is stored in the user information management database (DB) 26 of the authentication server 2.

Note that it is also possible to have an arrangement in which the Cookie information stored in the web browser section 15 is transmitted to the authentication server 2 when the user logs out, regardless of whether or not the Cookie information was updated. In this case, the update judgment of S32 and S33 is omitted.

[Details of Process of S38]

Figure 13:
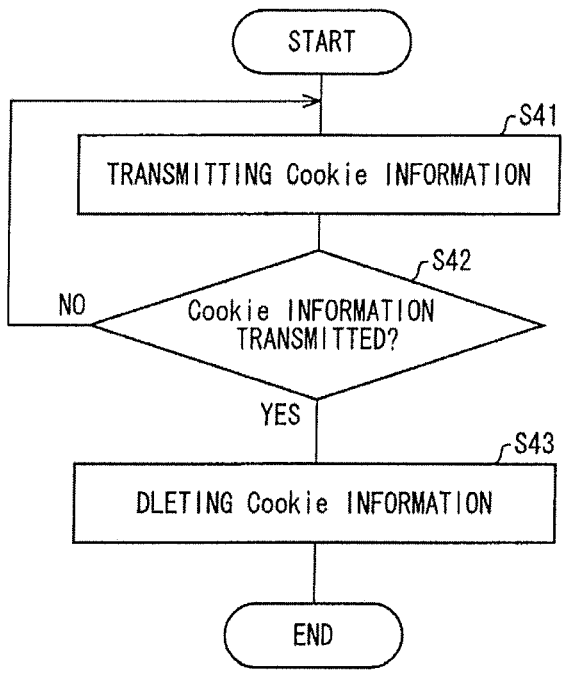
FIG. 13

Next, the following description deals with details of the process of S38 shown in FIG. 12, with reference to FIG. 13. FIG. 13 is a flowchart showing details of the process of S38 shown in FIG. 12. In a case where it is judged that the transmission of the Cookie information was unsuccessful (NO in Step S35), the apparatus control section 10 transmits the copy of the Cookie information to the authentication server (S41) (see FIG. 13).

Then, the apparatus control section 10 judges whether or not the transmission of the copy of the Cookie information to the authentication server 2 was successful (S42). In a case where it is judged that the transmission of the copy of the Cookie information was unsuccessful (NO in S42), the apparatus control section 10 (i) returns to the process of S41 and (ii) keeps trying to transmit the copy of the Cookie information to the authentication server 2 at predetermined time intervals. Note that the apparatus control section 10 repeats the processes of S41 and S42 until it is judged that the transmission of the Cookie information was successful.

On the other hand, in a case where it is judged that the transmission of the Cookie information was successful (YES in S42), the apparatus control section 10 deletes the copy of the Cookie information (S43), and the process proceeds to S36 shown in FIG. 12.

This makes sure that the Cookie information is successfully transmitted from the multifunction apparatus 1 to the authentication server 2.

[Details of Cookie Information Updating Process]

Figure 14:
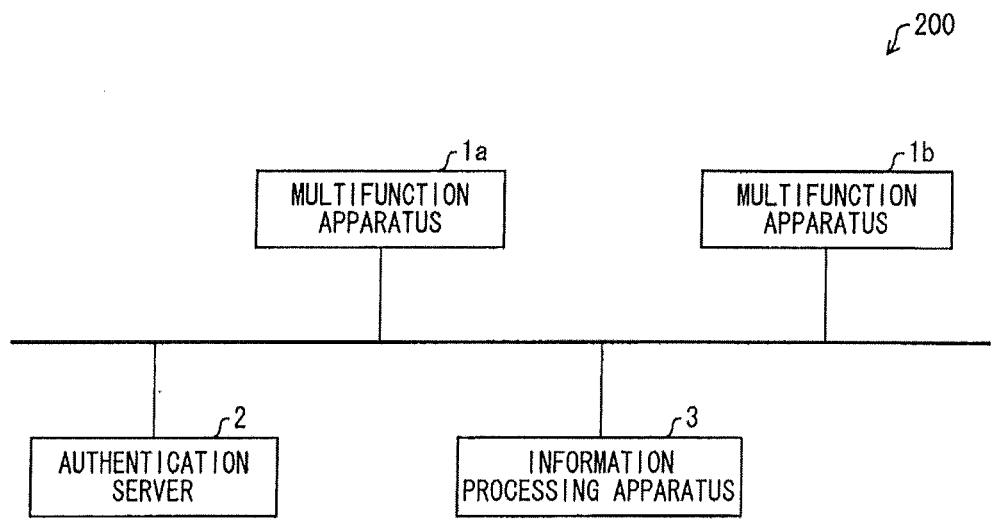
FIG. 14
Figures 15, 16:
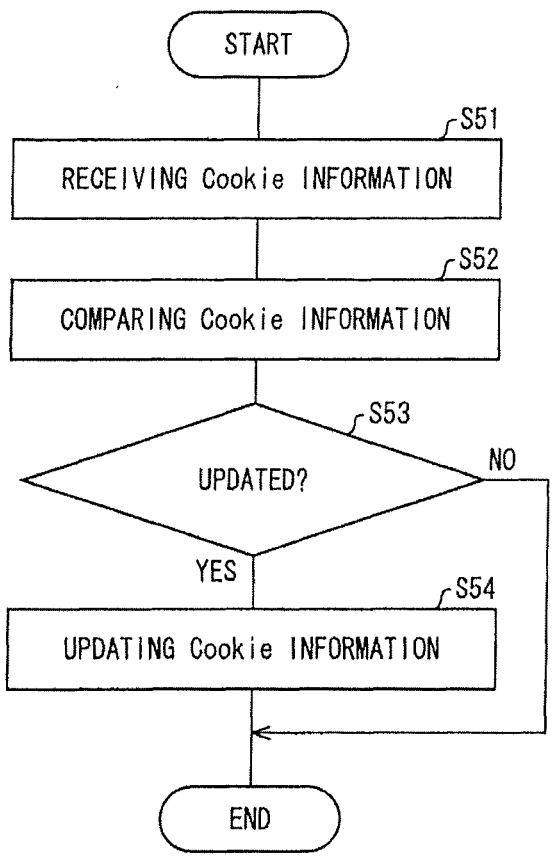
FIG. 15
FIG. 16

Next, the following description deals with the Cookie information updating process with reference to FIGS. 14 and 15. Note that the following example deals with a multifunction apparatus control system 200 illustrated in FIG. 14 so that the Cookie information updating process is understood more clearly.

FIG. 14 is a block diagram illustrating an arrangement of the multifunction apparatus control system 200. FIG. 15 is a flowchart showing how the Cookie information updating process is carried out in the multifunction apparatus control system 200 illustrated in FIG. 14.

The multifunction apparatus control system 200 includes: a multifunction apparatus 1*a*; a multifunction apparatus 1*b*; the authentication server 2; and the information processing apparatus 3 (see FIG. 14). In such a multifunction apparatus control system 200, for example, it is possible to (i) transmit the Cookie information from the multifunction apparatus 1*a* to the authentication server 2 and (ii) stores the Cookie information in the user management table 51 of the authentication server 2 without any change so as to update the Cookie information stored in the user management table. However, the following problem occurs in a case where an identical user logs in via different multifunction apparatuses 1*a* and 1*b* simultaneously (for example, there may be a case where the user carries out a long-term process continuously by the multifunction apparatus 1*a*, while the user carries out another process by the multifunction apparatus 1*b*).

That is, in a case where an identical user logs in via both the multifunction apparatuses 1*a* and 1*b* simultaneously, the Cookie information transmitted from the authentication server 2 to the multifunction apparatus 1*a* at the time of the user's login and the Cookie information transmitted from the authentication server 2 to the multifunction apparatus 1*b* at the time of the user's login are identical with each other. In this case, however, the user may use both the web browser section 15 of the multifunction apparatus 1*a* and the web browser section 15 of the multifunction apparatus 1*b*, and this may cause the web browser section 15 of the multifunction apparatus 1*a* and the web browser section 15 of the multifunction apparatus 1*b* to store different Cookie information respectively when the user logs out. For example, the user (i) logs out via the multifunction apparatus 1*a*, and then (ii) logs out via the multifunction apparatus 1*b*. In this case, the Cookie information of the multifunction apparatus 1*a*, via which the user has logged out earlier, is deleted due to the update by the Cookie information of the multifunction apparatus 1*b*.

In this regard, it is preferable to carry out the Cookie information update process in the following manner so that the Cookie information of the multifunction apparatus 1*a* and the Cookie information of the multifunction apparatus 1*b* are appropriately managed by the authentication server 2. That is, the Cookie information of each of the multifunction apparatuses 1*a* and 1*b* is not stored by merely updating the user management table 51 but (i) the Cookie information that is received from the multifunction apparatus 1 (1*a*, 1*b*) when the user logs out is compared with the Cookie information that has been stored in the user management so that a difference between them is obtained as difference information and (ii) the Cookie information that has been stored in the user management table 51 is updated by adding the difference information to the Cookie information that has been stored in the user management table 51.

In order to update the Cookie information stored in the user management table 1 appropriately, the authentication server 2 of the present embodiment compares the Cookie information received at the time of the user's logout with the Cookie information received at the time of the user's login. That is, upon receipt of Cookie information from the multifunction apparatus 1*a* (S51), the multifunction apparatus control section 24 (i) obtains, from the user information management database (DB) 26, the Cookie information that (a) was received at the time of the user's login and (b) has the same file name as that of the Cookie information received from the multifunction apparatus 1*a* and (ii) compares the Cookie information received from the multifunction apparatus 1*a* with the Cookie information that was (I) received at the time of the user's login and (II) read out from the user information management database (DB) 26 (S52) (see FIG. 15). Then, the multifunction apparatus control section 24 (i) judges whether or not the Cookie information received from the multifunction apparatus 1a was updated (S53) and (ii) identifies difference information.

In a case where it is judged that the Cookie information received from the multifunction apparatus 1a was updated (YES in S53), the multifunction apparatus control section 24 adds the difference information to the Cookie information that (i) is stored in the user information management database (DB) 26 and (ii) has the same file name as that of the Cookie information received from the multifunction apparatus 1a, so as to update the Cookie information stored in the user information management database (DB) 26 (S54).

On the other hand, in a case where it is judged that the Cookie information received from the multifunction apparatus 1a was not updated (NO in S53), the multifunction apparatus control section 24 finishes the process without updating the Cookie information stored in the user information management database (DB) 26. Note that it is judged that the Cookie information received from the multifunction apparatus 1a was not updated, for example, in such a case that (i) the update judgment of S32 and S33 shown in FIG. 12 is omitted and (ii) the Cookie information stored in the web browser section 15 is set to be transmitted to the authentication server 2 when the user logs out, regardless of whether or not the Cookie information was updated.

Then, upon receipt of the Cookie information from the multifunction apparatus 1b (S51), the multifunction apparatus control section 24 (i) obtains, from the user information management database (DB) 26, the Cookie information that has the same file name as that of the Cookie information received from the multifunction apparatus 1b and (ii) compares the Cookie information received from the multifunction apparatus 1b with the Cookie information read out from the user information management database (DB) 26 (S52). Here, the Cookie information read out from the user information management database (DB) 26 has been updated on the basis of the Cookie information received from the multifunction apparatus 1a. Then, the multifunction apparatus control section 24 compares the Cookie information received from the multifunction apparatus 1b with the Cookie information that has been updated on the basis of the Cookie information received from the multifunction apparatus 1a. The multifunction apparatus control section 24 judges whether or not the Cookie information received from the multifunction apparatus 1b was updated (S53), and identifies difference information. In a case where it is judged that the Cookie information was updated (YES in S53), the multifunction control section 24 adds the difference information to the Cookie information stored in the user information management database (DB) 26 so as to further update the Cookie information stored in the user information management database (DB) 26.

Here, the following description deals with the a concrete example of the Cookie information updating process carried out in the multifunction apparatus control system 200 illustrated in FIG. 14, with reference to FIGS. 16 through 18. First, the following description explains how the Cookie information updating process is carried out in a case where the multifunction apparatus 1a and the multifunction apparatus 1b simultaneously access respective web sites which have different domains.

FIG. 16 is a view showing Cookie information 54 transmitted from the multifunction apparatus 1a to the authentication server 2. FIG. 17 is a view showing Cookie information 55 transmitted from the multifunction apparatus 1b to the authentication server 2. FIG. 18 is a view showing an example of a Cookie information table 56 which has been updated on the basis of the Cookie information 54 shown in FIG. 16 and the Cookie information 55 shown in FIG. 17.

For example, it is assumed that the user simultaneously logs in via both the multifunction apparatuses 1a and 1b, and the Cookie information stored in the Cookie information table 53 shown in FIG. 9 is transmitted from the authentication server 2 to the multifunction apparatuses 1a and 1b. Here, the user accesses, via the multifunction apparatus 1a, a web site whose domain is "example.net", so that the Cookie information is updated, for example. In this case, when the user logs out via the multifunction apparatus 1a, the Cookie information 54 shown in FIG. 16 is transmitted from the multifunction apparatus 1a to the authentication server 2. Content of the Cookie information 54 is different from that of the Cookie information table 53 in that the Cookie information table 53 does not contain Cookie information in a third line of the Cookie information 54. In this case, the multifunction apparatus control section 24 (i) identifies the Cookie information in the third line of the Cookie information 54 as the difference information and (ii) adds the Cookie information in the third line of the Cookie information 54 to the Cookie information table 53 stored in the user information management database (DB) 26 of the authentication server 2. At this point, the content of the Cookie information management table stored in the user information management database (DB) 26 becomes identical with that of the Cookie information 54.

Meanwhile, the user logs in via the multifunction apparatus 1b while the user has not logged out via the multifunction apparatus 1a yet. The user accesses a web site whose domain is "example.org" via the multifunction apparatus 1b, so that the Cookie information is updated, for example. In this case, when the user logs out via the multifunction apparatus 1b, the Cookie information 55 shown in FIG. 17 is transmitted from the multifunction apparatus 1b to the authentication server 2. The content of the Cookie information 55 is different from that of the Cookie information table 53 in that the Cookie information table 53 does not contain Cookie information in a third line of the Cookie information 55. The multifunction apparatus control section 24 (i) compares the Cookie information 55 received from the multifunction apparatus 1b with the Cookie information table 53 that has been updated on the basis of the Cookie information 54 received from the multifunction apparatus 1a, and (ii) judges whether or not the Cookie information 55 was updated. In this case, the multifunction apparatus control section 24 (i) identifies the Cookie information in the third line of the Cookie information 55 as the difference information and (ii) adds the Cookie information in the third line of the Cookie information 55 to the Cookie information table 53 that has been updated on the basis of the Cookie information 54 shown in FIG. 16, so as to further update the Cookie information table 53. This causes the content of the Cookie information stored in the user information management database (DB) 26 to be identical with that of the Cookie information table 56 shown in FIG. 18.

As described above, (i) the Cookie information stored in the user information management database (DB) 26 and the Cookie information received from the multifunction apparatus 1b are compared with each other so as to identify the difference information, and (ii), instead of causing the user information management database (DB) 26 to store the Cookie information received from the multifunction apparatus 1b without any change, the difference information is added to the Cookie information stored in the user information management database (DB) 26 so as to update the Cookie information stored in the user information management database (DB) 26. Therefore, even if the user logs in via a plurality of multifunction apparatuses simultaneously, it is possible to appropriately manage the Cookie information of each of the plurality of multifunction apparatuses in the user information management database (DB) 26 without any loss of information. That is, according to the present embodiment, it is possible to appropriately store, in the user information management database (DB) 26, the Cookie information newly stored in the third line of the Cookie information 54 of the multifunction apparatus 1a by preventing deletion of such Cookie information.

Next, the following description deals with how the Cookie information updating process is carried out in a case where the multifunction apparatuses 1a and 1b simultaneously access an identical web site (identical domain). In a case where the multifunction apparatuses 1a and 1b simultaneously access the identical web site having a domain of "example.net", the Cookie information containing the domain of "example.net" is stored in each of the web browser sections 15 of the multifunction apparatuses 1a and 1b. Under the circumstances, if the user logs out via the multifunction apparatus 1a first, the multifunction apparatus control section 24 (i) identifies the updated Cookie information in the third line of the Cookie information 54 shown in FIG. 16 and (ii) adds the Cookie information in the third line of the Cookie information 54 to the user information management database (DB) 26 as the difference information. At this point, the Cookie information management table stored in the user information management database (DB) 26 has content that is identical with that of the Cookie information 54 shown in FIG. 16.

Then, when the user logs out via the multifunction apparatus 1b, the multifunction apparatus control section 24 recognizes that there is Cookie information in the user information management database (DB) 26, which Cookie information has (i) the domain of "example.net" and (ii) the parameter of "username", which are identical with those of the Cookie information of the multifunction apparatus 1b. In this case, the multifunction apparatus control section 24 (i) compares an expiration date of the Cookie information received from the multifunction apparatus 1b with the expiration date of the Cookie information having the identical domain of "example.net" and the identical parameter of "username", stored in the user information management database (DB) 26 and (ii) rewrites the Cookie information stored in the user information management database (DB) 26 on the basis of the one that has the later expiration date so as to update the Cookie information stored in the user information management database (DB) 26.

As described above, the multifunction apparatus control system 100 of the present embodiment includes the multifunction apparatus 1, the authentication server 2, and the information processing apparatus 3. According to the multifunction apparatus control system 100, the multifunction apparatus 1 transmits the login information to the authentication server 2, and the authentication server 2 carries out the user authentication process. Then, the authentication server 2 transmits the Cookie information to the multifunction apparatus 1, and the web browser section 15 (i) stores the Cookie information and (ii) updates the Cookie information as appropriate. When the user logs out via the multifunction apparatus 1, the multifunction apparatus 1 transmits the updated Cookie information to the authentication server 2, and the authentication server 2 stores the updated Cookie information. When the user logs in via the multifunction apparatus 1 again, the authentication server 2 transmits the updated Cookie information stored in the authentication server 2 to the multifunction apparatus 1.

As described above, according to the multifunction apparatus control system 100, the authentication server 2 (i) collectively carries out the user authentication process for identifying the user who operates the multifunction apparatus 1 and (ii) manages the Cookie information. This makes it possible to constitute the multifunction apparatus control system 100 in which the Cookie information can be shared by a plurality of multifunction apparatuses.

Modified Example 1

In the above descriptions of the present embodiment, in a case where it is judged that the Cookie information was obtained in S6 shown in FIG. 2 (YES in S6), the authentication server 2 transmits the Cookie information to the multifunction apparatus 1 so as to cause the web browser section 15 to store the Cookie information. Note, however, that the present invention is not limited to the arrangement. The authentication server 2 may transmit the Cookie information to the multifunction apparatus 1 on the basis of user's use authority with respect to the web browser section 15, for example.

In a case where a user has no use authority with respect to a web browser section 15, Cookie information stored in the web browser section 15 would not be updated. Therefore, by causing the Cookie information not to be transmitted to the multifunction apparatus 1, it becomes possible to (i) reduce network traffic and (ii) make it unnecessary to ensure a standby time period for transmission of the Cookie information. Further, this also reduces a load of the multifunction apparatus 1, e.g. a load of receiving the Cookie information and storing the Cookie information in the web browser section 15. Such a process is described below in detail with reference to FIGS. 2 and 19.

Figure 19:
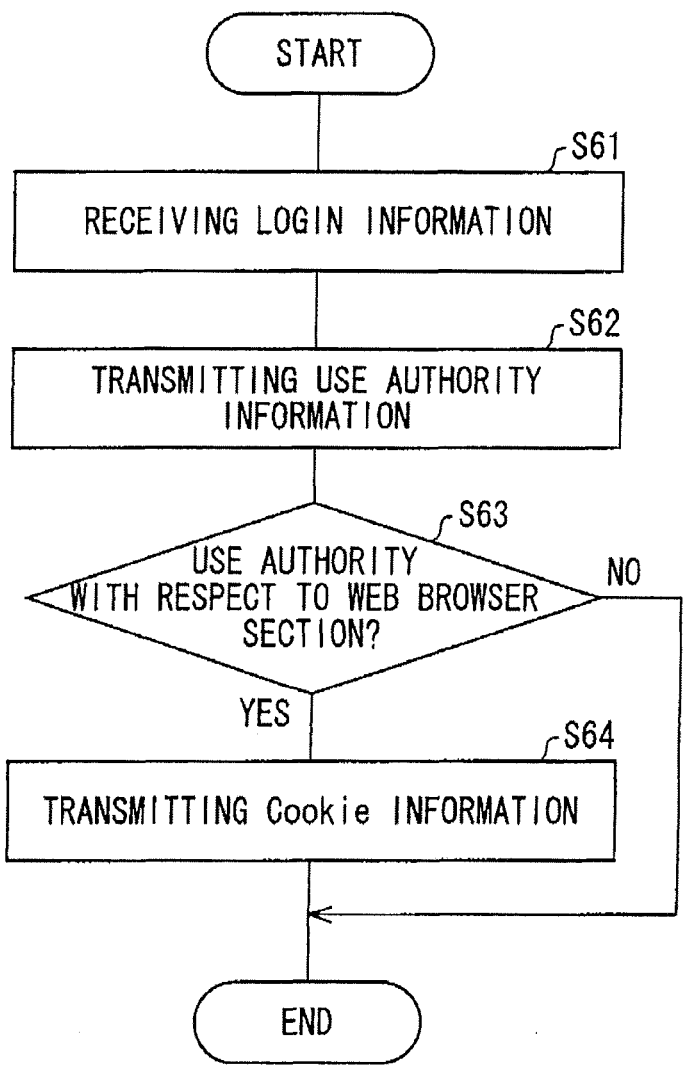
FIG. 19

FIG. 19 is a flowchart showing a modified example of a login process which is carried out in a multifunction apparatus control system 100 illustrated in FIG. 2.

In a case where login information is received from the multifunction apparatus 1 (S61), a user authentication section 25 (i) carries out a user authentication process with respect to the received login information and (ii) judges whether or not the user authentication process was successful (see FIG. 19). In a case where it is judged that the user authentication process was successful, a multifunction apparatus control section 24 (i) generates a function control command on the basis of user's use authority with respect to each of functions of the multifunction apparatus 1 and (ii) transmits the function control command to the multifunction apparatus 1 (S62).

Next, the multifunction apparatus control section 24 judges whether or not the user has use authority with respect to the web browser section 15 (S63). In a case where it is judged that the user has the use authority with respect to the web browser section 15 (YES in S63), the multifunction apparatus control section 24 transmits the Cookie information to the multifunction apparatus 1.

On the other hand, in a case where it is judged that the user has no use authority with respect to the web browser section 15 (NO in S63), the multifunction apparatus control section 24 does not transmit the Cookie information to the multifunction apparatus 1. In a case of a function management table 52 shown in FIG. 8, use authority with respect to "document management application function" is "invalid" for a user having a user ID of "1". Therefore, the multifunction apparatus control section 24 does not transmit the Cookie information to the multifunction apparatus 1 when the user having the user ID of "1" logs in. In contrast, the use authority with respect to "document management application function" is "valid" for a user having a user ID of "2". Therefore, the multifunction apparatus control section 24 transmits the Cookie information to the multifunction apparatus 1 when the user having the user ID of "2" logs in.

As described above, according to the present modified example, the Cookie information is transmitted to the multifunction apparatus 1 on the basis of the user's use authority with respect to the web browser section 15. Therefore, it is possible to (i) reduce network traffic (ii) make it unnecessary to ensure a standby time period for the transmission of the Cookie information and (iii) reduce a load of the multifunction apparatus 1, such as a load of receiving the Cookie information and storing the Cookie information in the web browser section 15, as described above.

Modified Example 2

Further, in the above descriptions of the present embodiment, (i) the apparatus control section 10 transmits all Cookie information stored in the web browser section 15 from the multifunction apparatus 1 to the authentication server 2 in the Cookie information transmission process (S34 shown in FIG. 12) and (ii) the authentication server 2 collectively manages all the Cookie information. This allows all the Cookie information to be shared by a plurality of multifunction apparatuses. Note, however, that the present invention is not limited to the arrangement. For example, it is possible that (i) the multifunction apparatus 1 transmits, to the authentication server 2, only specific Cookie information stored in the web browser section 15 and (ii) the authentication server 2 manages the specific Cookie information. This allows only the specific Cookie information to be shared by the plurality of multifunction apparatuses.

Specifically, an apparatus control section 10 searches for Cookie information containing a specific domain or a specific URL from among Cookie information stored in a web browser section 15, before transmitting the Cookie information to the authentication server 2 in S34. In a case where there is the Cookie information containing the specific domain or the specific URL, the apparatus control section 10 (i) cut out, from the Cookie information, Cookie information other than the Cookie information containing the specific domain or the specific URL, and (ii) stores, in a memory, the Cookie information other than the Cookie information containing the specific domain or the specific URL. Then, the apparatus control section 10 transmits only the Cookie information containing the specific domain or the specific URL to the authentication server 2. The authentication server 2 (i) stores, in the user information management database (DB) 26, the Cookie information containing the specific domain or the specific URL and (ii) manages the Cookie information containing the specific domain or the specific URL.

As described above, according to the present modified example, (i) only the Cookie information containing the specific domain or the specific URL is transmitted to the authentication server 2 and (ii) the authentication server 2 manages the Cookie information containing the specific domain or the specific URL. This allows only the Cookie information containing the specific domain or the specific URL to be shared by a plurality of multifunction apparatuses.

Meanwhile, the Cookie information other than the Cookie information containing the specific domain or the specific URL, stored in the apparatus control section 10, is not deleted in a subsequent step of S36 but managed by each of the plurality of multifunction apparatuses.

Note that the specific domain or the specific URL for designating the Cookie information to be shared by the plurality of multifunction apparatuses is stored in a memory in advance by the user. The user can modify the specific domain or the specific URL in accordance with his/her purpose, appropriately.

As described above, according to the present modified example, it is possible to manage only the Cookie information containing the specific domain or the specific URL by the authentication server 2 so that only the Cookie information containing the specific domain or the specific URL can be shared by the plurality of multifunction apparatuses. Therefore, for example, it is possible to set, for each Cookie information, whether or not that Cookie information is shared by the plurality of multifunction apparatuses, independently. For example, it is possible to have such a setting that (i) Cookie information related to an OSA application is to be shared by the plurality of multifunction apparatuses and (ii) Cookie information other than the Cookie information related to the OSA application is not to be shared by the plurality of multifunction apparatuses but managed in each of the plurality of multifunction apparatuses independently.

This makes it possible to optionally set, per specific domain or specific URL, whether or not the Cookie information is shared by the plurality of multifunction apparatuses, in accordance with desired security of the Cookie information and user's usage.

Note that it is also possible to have a more detailed setting as to whether or not the Cookie information is shared by the plurality of multifunction apparatuses. For example, it is possible to set, for each of sorts of external application 33 (e.g. a print application, a scan application, and an authentication application), whether or not the Cookie information is shared by the plurality of multifunction apparatuses.

In this case, the apparatus control section 10 searches for Cookie information containing information for identifying a specific sort of the external application 33, from among the Cookie information stored in the web browser section 15. In a case where there is the Cookie information containing the information for identifying the specific sort of the external application 33, the apparatus control section 10 transmits only the Cookie information containing such information to the authentication server 2. Specifically, in a case where the authentication server 2 manages only the Cookie information related to the scan application among the external applications 33, the apparatus control section 10 searches for the information for identifying the scan application from among the Cookie information stored in the web browser section 15. For example, in a case where some Cookie information contains "example.com/scan . . . ", the apparatus control section 10 (i) judges that the Cookie information corresponds to the scan application and (ii) transmits only such Cookie information to the authentication server 2.

As described above, it is possible to have a more detailed setting as to whether or not the Cookie information is shared. For example, it is possible to manage, per external application 33, whether or not the Cookie information is shared by the plurality of multifunction apparatuses.

This makes it possible to optionally set, per sort of external application 33, whether or not the Cookie information is shared by the plurality of multifunction apparatuses, in accordance with desired security of the Cookie information and user's usage.

Modified Example 3

Further, in the above descriptions of the present embodiment, the multifunction apparatus control section 24 updates the Cookie information by adding the difference information to the user information management database (DB) 26 in the Cookie information updating process (S54 shown in FIG. 15). This allows the authentication server 2 to appropriately manage the Cookie information obtained from the plurality of multifunction apparatuses. Note, however, that the present invention is not limited to the arrangement. For example, the multifunction apparatus control section 24 may (i) update the Cookie information stored in the user information management database (DB) 26 and then (ii) delete specific Cookie information from the user information management database (DB) 26. This allows the authentication server 2 to manage, per user or per web page, the Cookie information which is available for the multifunction apparatus.

Specifically, a multifunction apparatus control section 24 updates Cookie information stored in a user information management database (DB) 26 in S54 shown in FIG. 15, and then searches for Cookie information containing specific user information, a specific domain, or a specific URL, from among the Cookie information stored in the user information management database (DB) 26. In a case where there is the Cookie information containing the specific user information, the specific domain, or the specific URL, the multifunction apparatus control section 24 deletes such Cookie information from the user information management database (DB) 26. Accordingly, the deleted Cookie information is not to be transmitted to the multifunction apparatus 1 when the user logs in again. In this manner, it is possible to limit the multifunction apparatus 1 in using the Cookie information in accordance with the specific user or the specific web page.

Note that the specific user information, the specific domain, or the specific URL contained in the Cookie information, which is to be deleted, is registered in advance by the user in a memory. The user can modify such information appropriately in accordance with a user's purpose, if necessary.

As described above, according to the present modified example, the specific Cookie information stored in the user information management database (DB) 26 is deleted. Therefore, it is possible to allow the authentication server 2 to manage, per specific user or per specific application, the Cookie information which is available for the multifunction apparatus.

Conclusion of Embodiment

As described above, an authentication server of the present invention, which (i) communicates with a multifunction apparatus including a web browser section and (ii) carries out an authentication process for a user who operates the multifunction apparatus, the web browser section carrying out, by sending/receiving data to/from an application which is executed on a web server device, a cooperation process with the application, includes: a user authentication section for carrying out authentication for the user by (i) receiving, from the multifunction apparatus, login information entered in the multifunction apparatus and (ii) checking whether or not the login information matches user authentication information registered in advance; a Cookie information receiving section for receiving Cookie information from the multifunction apparatus with which the authentication of the user, carried out by the user authentication section, was successful, which Cookie information has been transmitted from the web server device to the web browser section of the multifunction apparatus; a Cookie information storage section for storing the Cookie information received by the Cookie information receiving section in such a way that the Cookie information and user identification information for identifying the user authenticated by the user authentication section are associated with each other; and a Cookie information sending section for, in a case where the authentication of the user, carried out by the authentication section, was successful, (i) reading out, from the Cookie information storage section, the Cookie information associated with the user identification information for identifying the user and (ii) sending the Cookie information read out from the Cookie information storage section to the multifunction apparatus from which the user authentication section has received the login information.

According to the arrangement, the user authentication section carries out authentication for the user by (i) obtaining, from the multifunction apparatus, the login information entered in the multifunction apparatus and (ii) checking whether or not the login information matches the user authentication information registered in advance. Then, in a case where the authentication of the user, carried out by the user authentication section, was successful, the Cookie information sending section (i) reads out, from the Cookie information storage section, the Cookie information associated with the user identification information for identifying the user and (ii) sending the Cookie information read out from the Cookie information storage section to the multifunction apparatus from which the user authentication section has received the login information. After that, in a case where the Cookie information receiving section receives the Cookie information which is transmitted from the web server device to the web browser section of the multifunction apparatus, the Cookie information storage section stores the Cookie information received by the Cookie information receiving section in such a way that the Cookie information and the user identification information for identifying the user authenticated by the user authentication section are associated with each other. As described above, according to the arrangement, the authentication server can (i) collectively carries out the authentication of the user who operates the multifunction apparatus and (ii) manage the Cookie information.

Therefore, it is possible to provide an authentication server which constitutes a multifunction apparatus control system in which Cookie information can be shared by a plurality of multifunction apparatuses.

Further, the authentication server of the present embodiment, preferably further includes an updating section for updating, on the basis of the Cookie information received by the Cookie information receiving section, the Cookie information that is (i) stored in the Cookie information storage section and (ii) associated with the user identification information for identifying the user authenticated by the user authentication section, the updating section carrying out the updating in a case where the Cookie information storage section has already stored the Cookie information associated with the user identification information for identifying the user authenticated by the user authentication section.

According to the arrangement, in a case where the Cookie information storage section has already stored the Cookie information associated with the user identification information for identifying the user authenticated by the user authentication section, the updating section updates the Cookie information stored in the Cookie information storage section on the basis of the Cookie information received by the Cookie information receiving section.

This makes it possible to update the Cookie information stored in the Cookie information storage section into the Cookie information obtained from the multifunction apparatus.

Further, in the authentication server of the present embodiment, the updating section preferably updates the Cookie information by (i) finding, as difference information, information that is contained in the Cookie information received by the Cookie information receiving section but not contained in the Cookie information stored in the Cookie information storage section and (ii) adding the difference information to the Cookie information stored in the Cookie information storage section.

According to the arrangement, the updating section (i) identifies the difference information between the Cookie information stored in the Cookie information storage section and the Cookie information received by the Cookie information receiving section and (ii) adds the difference information to the Cookie information stored in the Cookie information storage section so as to update the Cookie information stored in the Cookie information storage section. For example, in a case where an identical user logs in via different multifunction apparatuses simultaneously (e.g. the user carries out a long-term process on the multifunction apparatus A, while carrying out another process on the multifunction apparatus B), the Cookie information transmitted from the authentication server to the multifunction apparatus A and the Cookie information transmitted from the authentication server to the multifunction apparatus B are identical with each other. However, in a case where the user uses the web browser sections of the respective multifunction apparatuses A and B, the Cookie information received from the multifunction apparatus A by the Cookie information receiving section might be different from the Cookie information received from the multifunction apparatus B by the Cookie information receiving section. In this case, it is preferable to (i) identify the difference information between the Cookie information stored in the Cookie information storage section and the Cookie information received by the Cookie information receiving section and (ii) update the Cookie information stored in the Cookie information storage section by adding the difference information to the Cookie information stored in the Cookie information storage section. This allows the authentication server to appropriately manage the Cookie information of each of the multifunction apparatuses A and B, received by the Cookie information receiving section.

Therefore, the authentication server can appropriately manage the Cookie information obtained from the multifunction apparatus.

Further, in the authentication server of the present embodiment, the updating section preferably (i) searches for Cookie information containing predetermined specific user identification information, a predetermined specific domain, or a predetermined specific URL, from among the Cookie information that (a) is stored in the Cookie information storage section and (b) has been updated by the updating section, and (ii) deletes, from the Cookie information storage section, the Cookie information containing the predetermined specific user identification information, the predetermined specific domain, or the predetermined specific URL.

According to the arrangement, the updating section searches for the Cookie information containing the predetermined specific user identification information, the predetermined specific domain, or the predetermined specific URL, from among the Cookie information that (i) is stored in the Cookie information storage section and (ii) has been updated. In a case where there is the Cookie information containing the predetermined specific user identification information, the predetermined specific domain, or the predetermined specific URL, the updating section deletes, from the Cookie information storage section, the Cookie information containing the predetermined specific user identification, the predetermined specific domain, or the predetermined specific URL. Therefore, such Cookie information is not transmitted to the multifunction apparatus when the user logs in again, and the use of the multifunction apparatus by the user is limited.

That is, it is possible for the authentication server to manage, per specific user or specific application, the Cookie information that is available for the multifunction apparatus.

Further, in the authentication server of the present embodiment, preferably further includes a use authority information storage section in which user's use authority information is stored, the user's use authority information indicating whether or not the user has use authority with respect to the web browser section, and the Cookie information sending section preferably does not transmitting the Cookie information stored in the Cookie information storage section to the multifunction apparatus in a case where the user's use authority information corresponding to the user with whom the authentication was successful indicates that the user has no use authority with respect to the web browser section.

According to the arrangement, in a case where the user's use authority information stored in the use authority information storage section indicates that the user has no use authority with respect to the web browser section, the Cookie information sending section does not transmit the Cookie information to the multifunction apparatus, regardless of whether or not the authentication of the user, carried out by the user authentication section, was successful. This is because in a case where the user has no use authority with respect to the web browser section, the Cookie information would not be updated. For this reason, it is unnecessary for the authentication server to transmit the Cookie information to the multifunction apparatus.

With the arrangement, it is possible to (i) reduce the network traffic (ii) make it unnecessary to ensure the standby time period for the transmission of the Cookie information and (iii) reduce a load of the authentication server, such as a load of receiving and updating the Cookie information.

Further, a multifunction apparatus of the present embodiment, which causes, by communicating with an authentication server as set forth in claim 1, the authentication server to carry out an authentication process for a user who operates the multifunction apparatus, includes: a web browser section for carrying out data communication with an application that is executed on a web server device so as to carry out a cooperation process with the application; a login information sending section for sending login information entered in the multifunction apparatus to the authentication server; and a control section for, in a case where authentication of the user, carried out by the authentication server on the basis of the login information received from the login information sending section, was successful, (i) obtaining, from a Cookie information storage section of the authentication server, Cookie information associated with user identification information of the user who is indicated by the login information and (ii) causing the web browser section to operate by use of the Cookie information.

According to the arrangement, (i) the login information sending section transmits the login information entered in the multifunction apparatus to the authentication server and (ii), in the case where the authentication of the user, carried out by the authentication server on the basis of the login information received from the login information sending section, was successful, the control section obtains, from the Cookie information storage section of the authentication server, the Cookie information associated with the user identification information of the user indicated by the login information.

The control section can cause the web browser section to operate by use of the Cookie information. As described above, according to the arrangement, the authentication server (i) collectively carries out the authentication of the user who operates the multifunction apparatus and (ii) manages the Cookie information. Therefore, the multifunction apparatus can obtain the Cookie information from the authentication server, and use the Cookie information.

This makes it possible to provide, in the system in which a plurality of multifunction apparatuses are provided, the multifunction apparatus that can use the Cookie information which was stored when the identical user used another multifunction apparatus in the system last time.

Further, in the multifunction apparatus of the present embodiment, in a case where the web browser section performs the cooperation process with the application, the control section preferably causes the web browser section to transmit the Cookie information to the authentication server so that the Cookie information storage section is updated on the basis of the Cookie information that (i) was received from the web server device and (ii) is stored in the web browser section.

According to the arrangement, when the web browser section performs the cooperation process with the application, the control section transmits, to the authentication server, the Cookie information that (i) was received from the web server device by the web browser section and (ii) is stored in the web browser section.

This allows the authentication server to manage the Cookie information stored in the web browser section.

Further, in the multifunction apparatus of the present embodiment, the control section preferably (i) searches for Cookie information containing a predetermined specific domain or a predetermined specific URL from among Cookie information stored in the web browser section and (ii) causes only the Cookie information containing the predetermined specific domain or the predetermined specific URL to be transmitted to the authentication server.

According to the arrangement, the control section causes only the Cookie information containing the specific domain or the specific URL to be transmitted to the authentication server, out of the Cookie information stored in the web browser section. Therefore, it is possible to (i) manage only the Cookie information containing the specific domain or the specific URL by the authentication server and (ii) allow only such Cookie information to be shared by a plurality of multifunction apparatuses. As described above, by designating the specific domain or the specific URL in advance, it is possible to allow only the Cookie information containing the specific domain or the specific URL to be shared by the plurality of multifunction apparatuses.

This makes it possible to optionally set, per specific domain or specific URL, whether or not the Cookie information is shared by the plurality of multifunction apparatuses, in accordance with desired security and user's usage.

Further, in the multifunction apparatus of the present embodiment, the control section preferably (i) searches for Cookie information containing information for identifying a predetermined sort of application from among Cookie information stored in the web browser section and (ii) causes only the Cookie information containing the information for identifying the predetermined sort of application to be transmitted to the authentication server.

According to the arrangement, the control section causes only the Cookie information containing the information identifying the sort of the application that is executed on the web server section, out of the Cookie information stored in the web browser section. Therefore, it is possible to (i) manage only the Cookie information related to the specific application by the authentication server and (ii) allow such Cookie information to be shared by the plurality of the multifunction apparatuses. Here, examples of the sort of application encompass a print application, a scan application, and an authentication application. As described above, by designating the specific application in advance, it is possible to allow only the Cookie information related to the designated application to be shared by the plurality of multifunction apparatuses.

This makes it possible to optionally set, per sort of application, whether or not the Cookie information is shared, in accordance with desired security and user's usage.

Further, in the multifunction apparatus of the present embodiment, in a case where transmission of the Cookie information to the authentication server was successful, the control section preferably deletes such Cookie information stored in the web browser section.

According to the arrangement, in the case where the transmission of the Cookie information was successful, the control section deletes such Cookie information stored in the web browser section. For example, it would be necessary to ensure a huge storage capacity if Cookie information of all of the users is stored in the multifunction apparatus.

In this regard, by deleting the Cookie information at timing when the transmission of the Cookie information to the authentication server was successful, it becomes necessary to secure only a storage capacity for a single user in the multifunction apparatus.

This can significantly reduce a resource of an HDD or a memory provided in the multifunction apparatus.

Further, in the multifunction apparatus of the present embodiment, in a case where transmission of the Cookie information to the authentication server was unsuccessful, the control section preferably keeps storing Cookie information until the transmission of the Cookie information is accepted by the authentication server.

According to the arrangement, in the case where the transmission of the Cookie information to the authentication server was unsuccessful, the control section (i) stores the Cookie information and (ii) causes the Cookie information to be transmitted to the authentication server at timing when the transmission of the Cookie information is accepted by the authentication server.

Therefore, even if the Cookie information cannot be transmitted to the authentication server due to suspension of a communication network, it is possible to, by storing the Cookie information in the control section, successfully transmit the Cookie information to the authentication server without deleting any of Cookie information.

This makes it possible to successfully use the Cookie information even if the transmission of the Cookie information to the authentication server was unsuccessful.

Further, in the multifunction apparatus of the present embodiment, in a case where Cookie information stored in the web browser section was not updated, the control section preferably does not cause the Cookie information to be transmitted to the authentication server.

According to the arrangement, in the case where the Cookie information stored in the web browser section was not updated, the control section does not cause the Cookie information to be transmitted to the authentication server. This is because, for example, in a case where the web browser section is not used during a time period from a user's login to a user's logout, the Cookie information stored in the web browser section would not be updated, and it is therefore unnecessary to transmit the Cookie information to the authentication server.

With this arrangement, it is possible to (i) reduce network traffic (ii) make it unnecessary to ensure a standby time period for the transmission of the Cookie information and (iii) reduce a load of the authentication server.

Further, in the multifunction apparatus of the present embodiment, the control section preferably causes no Cookie information to be transmitted to the authentication server in a case where a user who logs in has no use authority with respect to the web browser section.

According to the arrangement, in the case where the user who logs in has no use authority with respect to the web browser section, the Cookie information is not transmitted to the authentication server. This is because, in the case where the user has no use authority with respect to the web browser section, the Cookie information would not be updated, and it is therefore unnecessary to transmit the Cookie information to the authentication server.

With this arrangement, it is possible to (i) reduce the network traffic (ii) make it unnecessary to ensure the standby time period for the transmission of the Cookie information and (iii) reduce a load of the multifunction apparatus, such as a load of receiving and storing the Cookie information.

Further, a multifunction apparatus control system of the present embodiment includes the authentication server, and the multifunction apparatus.

According to the arrangement, it is possible to constitute the multifunction apparatus control system in which Cookie information can be used by a user on a multifunction apparatus, which Cookie information was stored when the user used another multifunction apparatus in the system last time.

Note that the authentication server and the multifunction apparatus can be realized by a computer. In this case, the scope of the present invention encompass a program for realizing the multifunction apparatus on the computer by causing the computer to function as each of the sections of the multifunction apparatus, and a computer-readable storage medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of the blocks of the multifunction apparatus 1 and the authentication server 2 can be realized by a hardware logic or by software by use of a CPU (Central Processing Unit) as described below.

That is, each of the multifunction apparatus 1 and the authentication server 2 includes: the CPU (central processing unit) which executes an instruction of a control program realizing each of the functions described above; a ROM (read only memory) in which the program is stored; a RAM (random access memory) which develops the program; a storage device (storage medium), such as a memory, in which the program and various kinds of data are stored; and the like.

Further, the object of the present invention can be achieved in the following manner: (i) a storage medium for computer-readably storing a program code (an execute form program, intermediate code program, or source program) of the apparatus control section 10 and the user authentication processing section 21, which is software for implementing the aforementioned functions, is provided to the multifunction apparatus 1 and the authentication server 2, and (ii) a computer (or a CPU or a MPU (Microprocessor Unit)) of each of the multifunction apparatus 1 and the authentication server 2 reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs (Compact Disc Read-Only Memories), MOs (Magnetic Optical Disks), MDs (mini disks), DVDs (digital video disks), and CD-Rs (CD Recordable); cards, such as IC cards (including memory cards) and optical cards; and semiconductor memories, such as mask ROMs, EPROMs (Erasable Programmable Read-Only Memory), EEPROMs (Electrically Erasable and Programmable Read-Only Memory), and flash ROMs.

Further, each of the multifunction apparatus 1 and the authentication server 2 can be made connectable to a communication network, and the program code can be supplied via the communication network. The communication networks are not limited to specific means. Examples of the communication network encompass the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE (Institute of Electrical and Electronic Engineers) 1394 standard, a USB line, a power line, a cable TV line, a telephone line, an ADSL (Asynchronous Digital Subscriber Loop) line, and the like, as the transmission medium. Moreover, it is possible to use (i) a wireless line utilizing an infrared ray used in IrDA (Infrared Data Association) and a remote controller, (ii) a wireless line which is in compliance with a Bluetooth standard (registered trademark) or an IEEE802.11 wireless standard, and (iii) a wireless line utilizing an HDR (High Data Rate), a mobile phone network, a satellite line, a terrestrial digital network, and the like, as the transmission medium. Note that, the present invention can be realized by a computer data signal which is realized by electronic transmission of the program code and which is embedded in a carrier wave.

INDUSTRIAL APPLICABILITY

The present invention is suitably applicable to a total application system including a plurality of multifunction apparatuses each of which can carry out a plurality of functions such as a copying function, a scanning function, and a faxing function.

REFERENCE SIGNS LIST

1: Multifunction apparatus
1a: Multifunction apparatus
1b: Multifunction apparatus
2: Authentication server
3: Information processing apparatus
10: Apparatus control section (control section)
14: First communication section (login information transmission section)
15: Web browser section
20: Second communication section (Cookie information sending section, Cookie information receiving section)
21: User authentication processing section 24: Multifunction apparatus control section (updating section)
25: User authentication section
26: User information management database (Cookie information storage section, use authority information storage section)
100: Multifunction apparatus control system
200: Multifunction apparatus control system

The invention claimed is:

1. An authentication server which (i) communicates with a multifunction apparatus including a web browser section and (ii) carries out an authentication process for a user who operates the multifunction apparatus, the web browser section carrying out, by sending/receiving data to/from an application which is executed on a web server device, a cooperation process with the application, comprising:
   a user authentication section for carrying out authentication for the user by (i) receiving, from the multifunction apparatus, login information entered into the multifunction apparatus and (ii) checking whether or not the login information matches user authentication information registered in advance;
   a Cookie information receiving section for receiving Cookie information from the multifunction apparatus with which the authentication of the user, carried out by the user authentication section, was successful, which Cookie information has been transmitted from the web server device to the web browser section of the multifunction apparatus;
   a Cookie information storage section for storing the Cookie information received by the Cookie information receiving section in such a way that the Cookie information and user identification information for identifying the user authenticated by the user authentication section are associated with each other; and
   a Cookie information sending section for, in a case where the authentication of the user, carried out by the user authentication section, was successful, (i) reading out, from the Cookie information storage section, the Cookie information associated with the user identification information for identifying the user and (ii) sending the Cookie information read out from the Cookie information storage section to the multifunction apparatus from which the user authentication section has received the login information.

2. The authentication server as set forth in claim 1, further comprising:
   an updating section for updating, on the basis of the Cookie information received by the Cookie information receiving section, the Cookie information that is (i) stored in the Cookie information storage section and (ii) associated with the user identification information for identifying the user authenticated by the user authentication section,
   the updating section carrying out said updating in a case where the Cookie information storage section has already stored the Cookie information associated with the user identification information for identifying the user authenticated by the user authentication section.

3. The authentication server as set forth in claim 2, wherein:
   the updating section updates the Cookie information by (i) finding, as difference information, information that is contained in the Cookie information received by the Cookie information receiving section but not contained in the Cookie information stored in the Cookie information storage section and (ii) adding the difference information to the Cookie information stored in the Cookie information storage section.

4. The authentication server as set forth in claim 2, wherein:
   the updating section (i) searches for Cookie information containing predetermined specific user identification information, a predetermined specific domain, or a predetermined specific URL, from among the Cookie information that (a) is stored in the Cookie information storage section and (b) has been updated by the updating section and (ii) deletes, from the Cookie information storage section, the Cookie information containing the predetermined specific user identification information, the predetermined specific domain, or the predetermined specific URL.

5. The authentication server as set forth in claim 1, further comprising:
   a use authority information storage section in which user's use authority information is stored, the user's use authority information indicating whether or not the user has use authority with respect to the web browser section,
   the Cookie information sending section not transmitting the Cookie information stored in the Cookie information storage section to the multifunction apparatus in a case where the user's use authority information corresponding to the user with whom the authentication was successful indicates that the user has no use authority with respect to the web browser section.

6. A multifunction apparatus which causes, by communicating with an authentication server as set forth in claim 1, the authentication server to carry out an authentication process for a user who operates the multifunction apparatus, comprising:
   a web browser section for carrying out data communication with an application that is executed on a web server device so as to carry out a cooperation process with the application;
   a login information sending section for sending login information entered in the multifunction apparatus to the authentication server; and
   a control section for, in a case where authentication of the user, carried out by the authentication server on the basis of the login information received from the login information sending section, was successful, (i) obtaining, from a Cookie information storage section of the authentication server, Cookie information associated with user identification information of the user who is indicated by the login information and (ii) causing the web browser section to operate by use of the Cookie information.

7. The multifunction apparatus as set forth in claim 6, wherein:
   in a case where the web browser section performs the cooperation process with the application, the control section causes the web browser section to transmit the Cookie information to the authentication server so that the Cookie information storage section is updated on the basis of the Cookie information that (i) was received from the web server device and (ii) is stored in the web browser section.

8. The multifunction apparatus as set forth in claim 7, wherein:
   the control section (i) searches for Cookie information containing a predetermined specific domain or a predetermined specific URL from among Cookie information stored in the web browser section and (ii) causes only the Cookie information containing the predetermined specific domain or the predetermined specific URL to be transmitted to the authentication server.

9. The multifunction apparatus as set forth in claim 7, wherein:
the control section (i) searches for Cookie information containing information for identifying a predetermined sort of application, from among Cookie information stored in the web browser section and (ii) causes only the Cookie information containing the information for identifying the predetermined sort of application to be transmitted to the authentication server.

10. The multifunction apparatus as set forth in claim 7, wherein:
in a case where transmission of the Cookie information to the authentication server was successful, the control section deletes such Cookie information stored in the web browser section.

11. The multifunction apparatus as set forth in claim 7, wherein:
in a case where transmission of the Cookie information to the authentication server was unsuccessful, the control section keeps storing such Cookie information until the transmission of the Cookie information is accepted by the authentication server.

12. The multifunction apparatus as set forth in claim 6, wherein:
in a case where Cookie information stored in the web browser section was not updated, the control section does not cause the Cookie information to be transmitted to the authentication server.

13. The multifunction apparatus as set forth in claim 7, wherein:
the control section causes no Cookie information to be transmitted to the authentication server in a case where a user who logs in has no use authority with respect to the web browser section.

14. A multifunction apparatus control system comprising:
a multifunction apparatus including a web browser section that carries out, by sending/receiving data to/from an application that is executed on a web server section, a cooperation process with the application; and
an authentication server for carrying out an authentication process for a user who operates the multifunction apparatus,
the authentication server including:
  a user authentication section for carrying out authentication for the user by (i) receiving, from the multifunction apparatus, login information entered into the multifunction apparatus and (ii) checking whether or not the login information matches user authentication information registered in advance;
  a Cookie information receiving section for receiving Cookie information from the multifunction apparatus with which the authentication of the user, carried out by the user authentication section, was successful, which Cookie information has been transmitted from the web server device to the web browser section of the multifunction apparatus;
  a Cookie information storage section for storing the Cookie information received by the Cookie information receiving section in such a way that the Cookie information and user identification information for identifying the user authenticated by the user authentication section are associated with each other; and
  a Cookie information sending section for, in a case where the authentication of the user, carried out by the user authentication section, was successful, (i) reading out, from the Cookie information storage section, the Cookie information associated with the user identification information for identifying the user and (ii) sending the Cookie information read out from the Cookie information storage section to the multifunction apparatus from which the user authentication section has received the login information,
the multifunction apparatus including:
  a web browser section for carrying out data communication with an application that is executed on a web server device so as to carry out a cooperation process with the application;
  a login information sending section for sending login information entered in the multifunction apparatus to the authentication server; and
  a control section for, in a case where authentication of the user, carried out by the authentication server on the basis of the login information received from the login information sending section, was successful, (i) obtaining, from a Cookie information storage section of the authentication server, Cookie information associated with user identification information of the user who is indicated by the login information and (ii) causing the web browser section to operate by use of the Cookie information.

15. A non-transitory computer-readable storage medium in which a program is stored,
the program causing a computer to function as each of said sections of an authentication server as set forth in claim 1.

16. A non-transitory computer-readable storage medium in which a program is stored,
the program causing a computer to function as each of said sections of a multifunction apparatus as set forth in claim 6.

* * * * *